United States Patent
Yazdi

(10) Patent No.: US 7,907,037 B2
(45) Date of Patent: Mar. 15, 2011

(54) MICRO-ELECTRO-MECHANICAL MODULE

(75) Inventor: Navid Yazdi, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 974 days.

(21) Appl. No.: 11/671,130

(22) Filed: Feb. 5, 2007

(65) Prior Publication Data

US 2007/0273463 A1    Nov. 29, 2007

Related U.S. Application Data

(60) Provisional application No. 60/765,244, filed on Feb. 4, 2006.

(51) Int. Cl.
*H01H 51/22* (2006.01)
(52) U.S. Cl. .......................... 335/78; 200/181
(58) Field of Classification Search ............. 335/78; 200/181
See application file for complete search history.

(56) References Cited

U.S. PATENT DOCUMENTS

| | | | |
|---|---|---|---|
| 6,800,912 B2 | 10/2004 | Ozgur | |
| 6,861,917 B2 | 3/2005 | Stevenson et al. | |
| 6,975,193 B2 | 12/2005 | Knieser et al. | |
| 7,155,182 B2 * | 12/2006 | Eckl et al. | 455/180.4 |
| 2002/0135428 A1 * | 9/2002 | Gomez | 331/17 |
| 2003/0146079 A1 * | 8/2003 | Goldsmith | 200/181 |
| 2003/0218514 A1 * | 11/2003 | Eckl et al. | 333/32 |
| 2004/0214543 A1 | 10/2004 | Osone et al. | |

* cited by examiner

*Primary Examiner* — Elvin G Enad
*Assistant Examiner* — Bernard Rojas
(74) *Attorney, Agent, or Firm* — Hartman & Hartman, P.C.; Gary M. Hartman; Domenica N. S. Hartman

(57) ABSTRACT

A MEMS module that contains at least one integrated energy storage device whose discharge is minimized and controlled, so that power is available for system operation over longer periods of time. The MEMS module includes a device electrically coupled to the energy storage device for controlling charge transfers from the energy storage device while preventing charge leakage from the energy storage device. The controlling device includes a plurality of integrated MEMS switches that define open electrical paths that prevent charge leakage from the energy storage device through the MEMS switches, and are then operable to define closed electrical paths to allow charge transfers from the energy storage device, and preferably also allow charge transfers to the energy storage device, through the MEMS switches. The charge transfer can be utilized to power electronic circuits or store data in non-volatile digital memory.

43 Claims, 14 Drawing Sheets

Nonvolatile Memory Block
(include all or a subset of the shown subblocks, Physical implementation may vary for different subblocks)

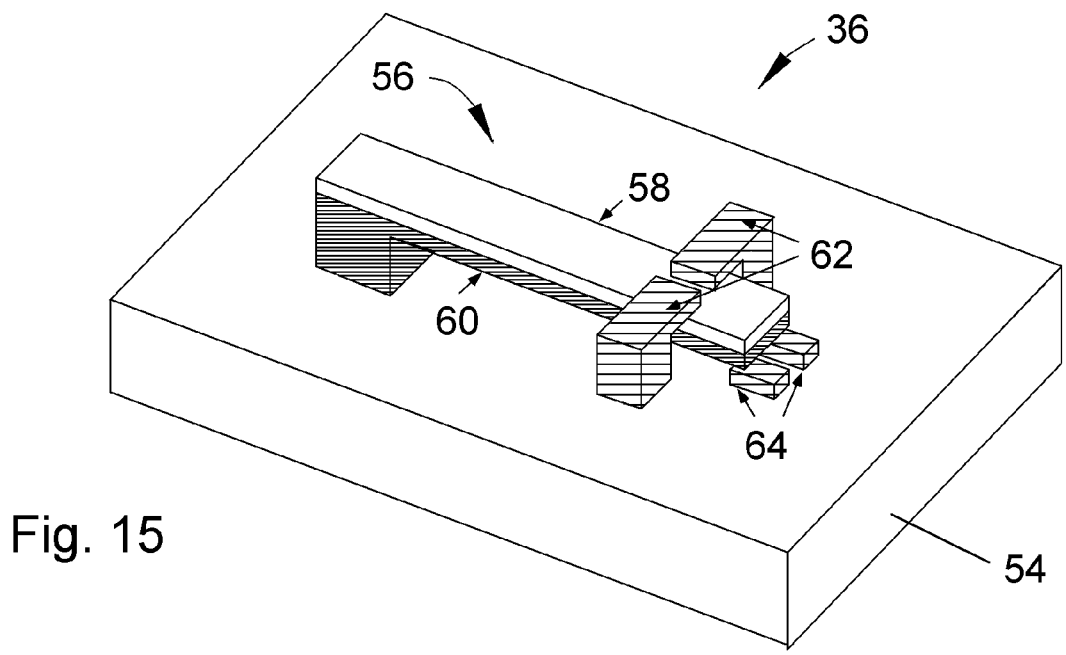
Fig. 15
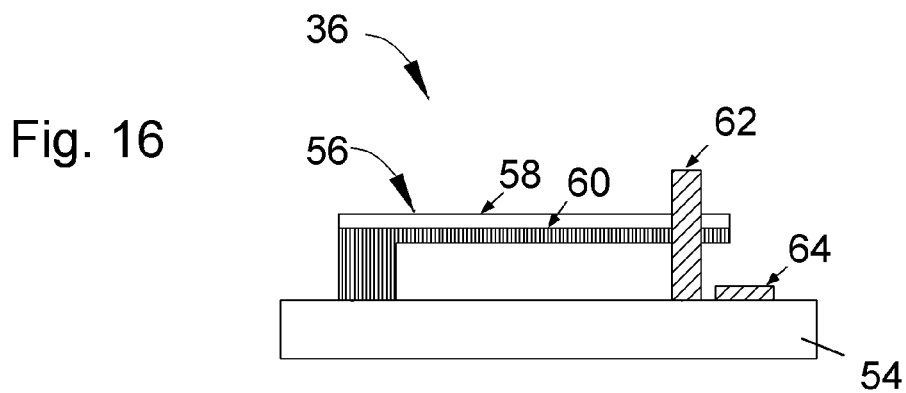
Fig. 16
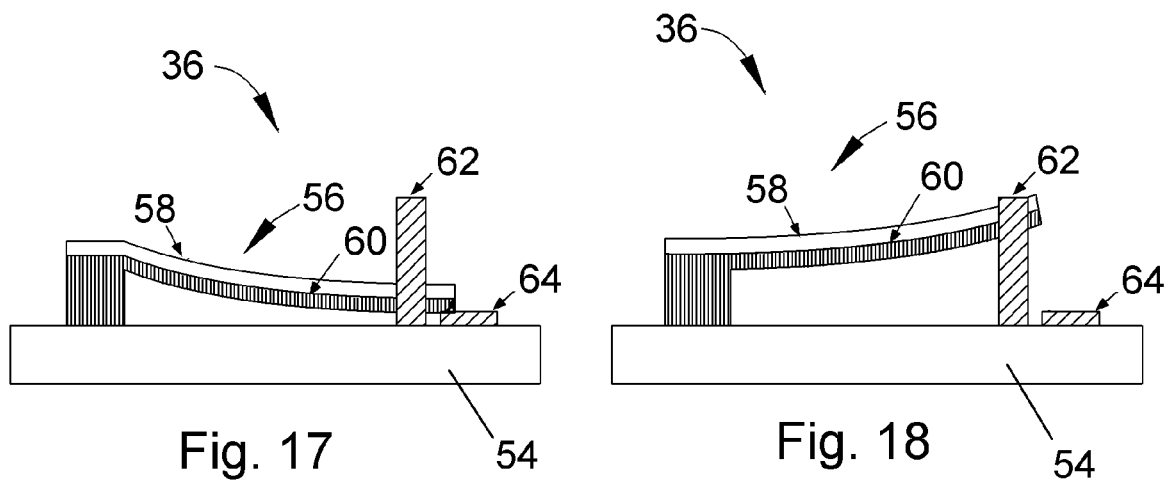
Fig. 17
Fig. 18

Fig. 32

Fig. 34
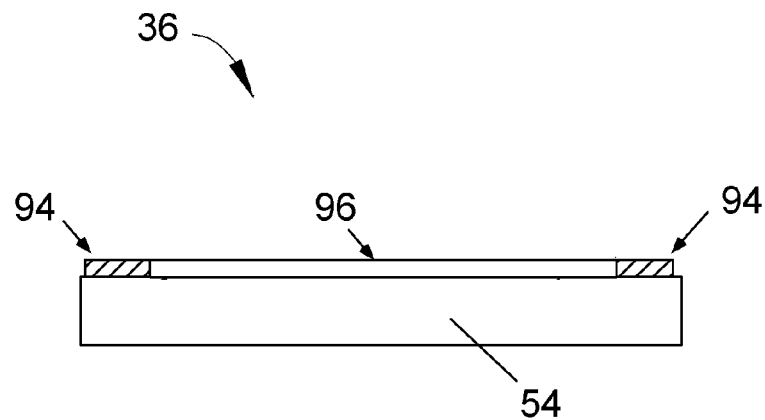
Fig. 35
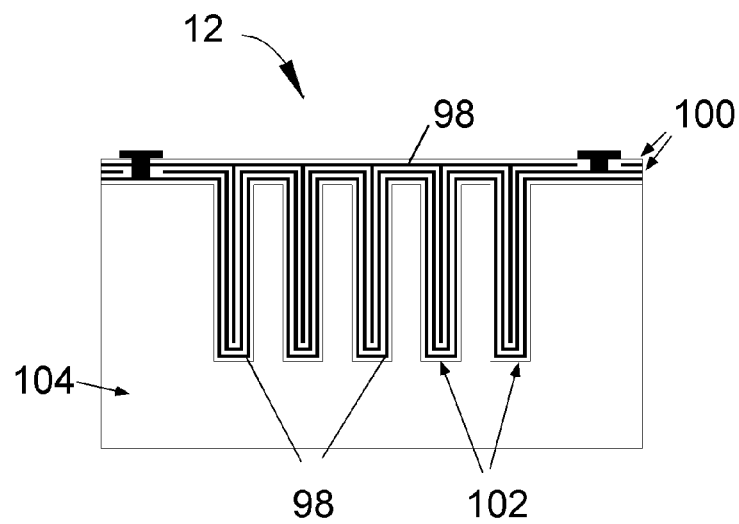
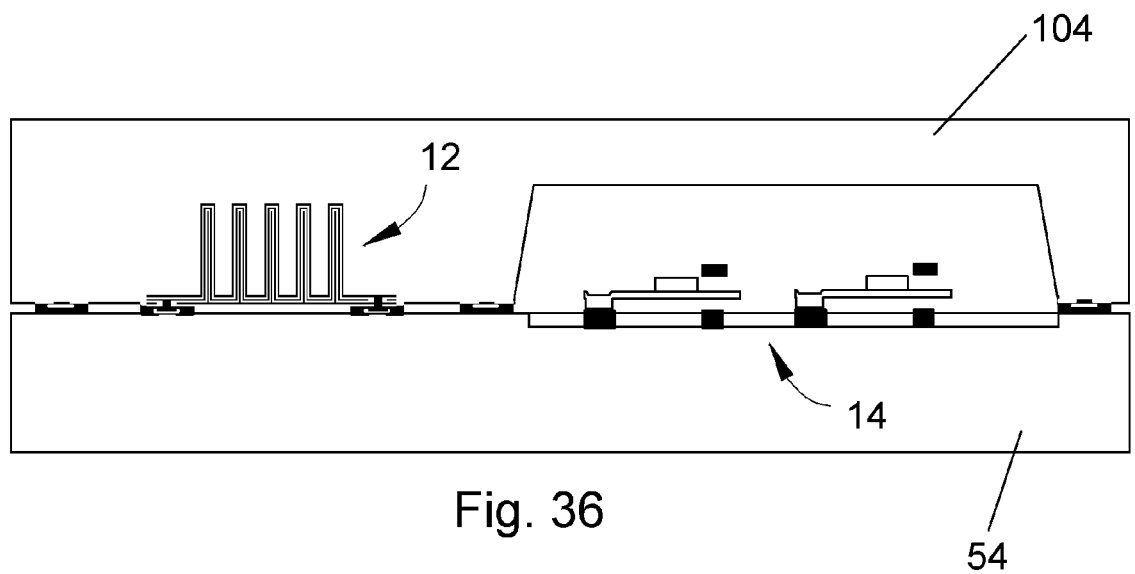
Fig. 36

MICRO-ELECTRO-MECHANICAL MODULE

CROSS REFERENCE TO RELATED APPLICATIONS

This application claims the benefit of U.S. Provisional Application No. 60/765,244, filed Feb. 4, 2006, the contents of which are incorporated herein by reference.

BACKGROUND OF THE INVENTION

The present invention generally relates to micro-electromechanical system (MEMS) and their fabrication. More particularly, this invention relates to a MEMS module capable of storing energy over an extended period of time by preventing charge leakage while allowing controlled charge transfers to and from an integrated energy storage device through the use of integrated MEMS switches. The MEMS switches can be adapted to be responsive to one or more external inputs, such as an environmental, chemical, or biological parameter, and the charge transfer through the switches can be utilized to power electronic circuits or store data in non-volatile digital memory, for example, to provide an output that correlates the charge transfer to an external input to which the switches are responsive.

Wireless sensor systems enable ambient intelligence, total visibility, and smart adaptive systems while having the capability of high reliability, efficiency, and performance. Such systems impact a wide range of applications including supply-chain and logistics, industrial and structural monitoring, healthcare, homeland security, and defense. Generally, it is desired to minimize the power dissipation, size, and cost of these systems by making them low-power and/or operate without a battery. Furthermore, in many applications a batteryless operation is needed due to lack of battery replacement feasibility, or to meet stringent cost, form factor, and lifetime requirements. One approach to address this need is scavenging energy from environmental sources such as ambient heat, radio and magnetic waves, vibrations, and light. However, in many situations, these environmental energy sources are not adequately available to power a sensor. Another approach is to remotely power a wireless sensor systems by inductive or electromagnetic coupling, storing energy on a suitable energy storage device, such as one or more integrated capacitors or miniature batteries, and performing sensor operations over short periods of time prior to minimize that discharge rate of the energy storage device.

A common drawback to the above sensor systems is the tendency for energy storage devices to discharge over extended periods of time, often as a result of charge leakage through the connected circuitry. This operational issue can be addressed with the use of sensors that do not require an external energy source for sensing, as their operations are based on chemical reactions or mechanical events that produce a color or other property change that can be detected by visual inspection or through the use of an electronic detection system. However, such sensors are generally limited to sensor labels and do not easily lend themselves to automation.

In view of the above, it would be desirable if devices requiring an energy storage capability were able to be powered over extended periods, yet provide a desirable level of functionality as compared to devices that do not have or require an energy storage capability.

BRIEF SUMMARY OF THE INVENTION

The present invention provides a MEMS module that contains an energy storage device whose discharge is minimized and controlled, so that power is available for system operation over longer periods of time.

According to the invention, the MEMS module includes at least one integrated energy storage device and a device electrically coupled to the energy storage device for preventing charge leakage while allowing controlled charge transfers from the energy storage device to enable the energy storage device to store energy over an extended period of time. The controlling device includes a plurality of integrated MEMS switches that define open electrical paths that prevent charge leakage from the energy storage device through the MEMS switches, and are then operable to define closed electrical paths to selectively and controllable allow charge transfers from the energy storage device through the MEMS switches. The controlling device may also optionally include one or more integrated MEMS switches to allow charge transfer to the energy storage device, so as for charging with an external wirelessly-coupled or wired power source.

According to an optional aspect of the invention, at least some of the MEMS switches are adapted to define the closed electrical paths in response to one or more external inputs, such as an environmental, chemical, or biological parameter including but not limited to vibration, tilt, shock/acceleration, pressure, humidity, and temperature. For example, the MEMS switches may include movable microstructures that respond to an external input by physical movement thereof between open positions that define the open electrical paths and closed positions that define the closed electrical paths. The movable microstructures can be associated with contacts to define switches therebetween, such that a gap exists between each movable microstructure and its respective contact when in the open position to substantially prevent charge leakage from the energy storage device. The movable microstructures are adapted to be responsive to changes in the external input so that when in the closed position each moveable microstructure contacts its respective contact and thereby allows charge transfer from the energy storage device.

According to another optional aspect of the invention, the MEMS module further includes a component, device, or system responsive to the MEMS switches when closed to define closed electrical paths that permit charge transfers. For example, the responsive feature may include a device for storing the charge transfers, such as one or more nonvolatile digital memory devices and/or nonvolatile mechanical memory devices. As another example, the responsive feature may include electronic circuits powered by the currents of the charge transfers. In either case, the responsive feature can be coupled to a device or system capable of correlating the charge transfer to the external input as a way of sensing or monitoring the external input.

In view of the above, it can be seen that the MEMS module is well suited for being configured as a sensor module, whose operation can be extended by minimizing and controlling the discharge of the energy storage device used to power the module, yet is capable of a far greater level of functionality as compared to devices that do not have any energy storage capability.

Other objects and advantages of this invention will be better appreciated from the following detailed description.

BRIEF DESCRIPTION OF THE DRAWINGS

FIGS. 15 and 16 schematically represent perspective and side views, respectively, of a MEMS switch configured as a temperature sensor element for use in a digital sensor array of a MEMS sensor module according to an optional aspect of the invention.

FIGS. 17 and 18 schematically represent the MEMS switch of FIGS. 15 and 16 at opposite extremes of its operating range in response to two threshold temperature conditions.

FIGS. 31 and 32 schematically represent side views of MEMS switches according to FIGS. 15 through 30, further equipped with means for tuning their sensing threshold using a stored charge according to an optional aspect of the invention.

FIG. 34 schematically represents a side view of a MEMS switch configured as a chemical or biological sensor element for use in a digital sensor array of a MEMS sensor module according to an optional aspect of the invention.

FIG. 35 schematically represents a configuration for an integrated high-density charge storage capacitor for use in a MEMS sensor module according to an optional aspect of the invention.

FIGS. 36, 37, and 38 schematically represent three optional techniques for integrating a charge storage capacitor and digital sensor array within a MEMS sensor module according to optional aspects of the invention.

DETAILED DESCRIPTION OF THE INVENTION

As will be evident from the following description, an object of this invention is to extend the life of a stored charge on a capacitor (or battery or other suitable energy storage device) by integrating the capacitor in a MEMS module containing one or more MEMS switches that physically isolate the capacitor from leaky electrical junctions. As used herein, the term MEMS (micro-electro-mechanical system) denotes a miniature device (generally on a scale of less than a millimeter) incorporating both electronic and mechanical functionalities and produced by micromachining techniques, such as bulk etching and surface thin-film etching.

Typically, charge storage capacitors are electrically isolated with electrical switches that leak current, such as at a p-n junction or gate. Though the charge leakage can be quite low, the inevitable effect is to discharge the capacitor over extended periods of time. Whereas such an effect is not detrimental to capacitors that can be periodically charged, charge leakage from a capacitor in a wireless and particularly batteryless sensor system drastically reduces the operational life of the sensor system. As a solution, the present invention provides a MEMS module equipped with one or more integrated charge storage capacitors capable of maintaining a suitable charge level over an extended period of time by controlling charge transfer from, and preferably also to, the capacitor(s). In particular, charge transfer is minimized and controlled with a plurality of integrated MEMS switches that, as mechanical switches, do not allow charge leakage when in an open state as do electrical switches. In preferred embodiments of the invention, the MEMS switches can also operate as sensors that are responsive to an external input, such as an external environmental, chemical, or biological parameter. Furthermore, the operation of the MEMS switches is capable of providing an output that can be stored and/or otherwise detected and then associated with the external input.

Figure 1:
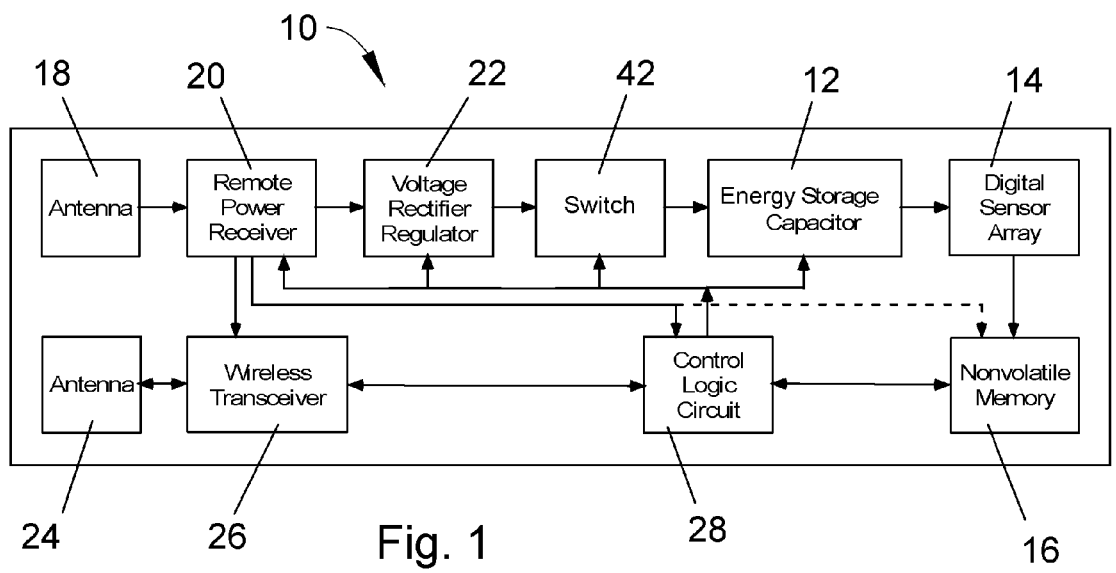
FIG. 1 is a simplified block diagram of a wireless MEMS sensor module equipped with a energy storage capacitor array, digital sensor array, and nonvolatile memory, in which the charge storage capacitor array is the only internal energy source of the module in accordance with an embodiment of the present invention.
Figure 2:
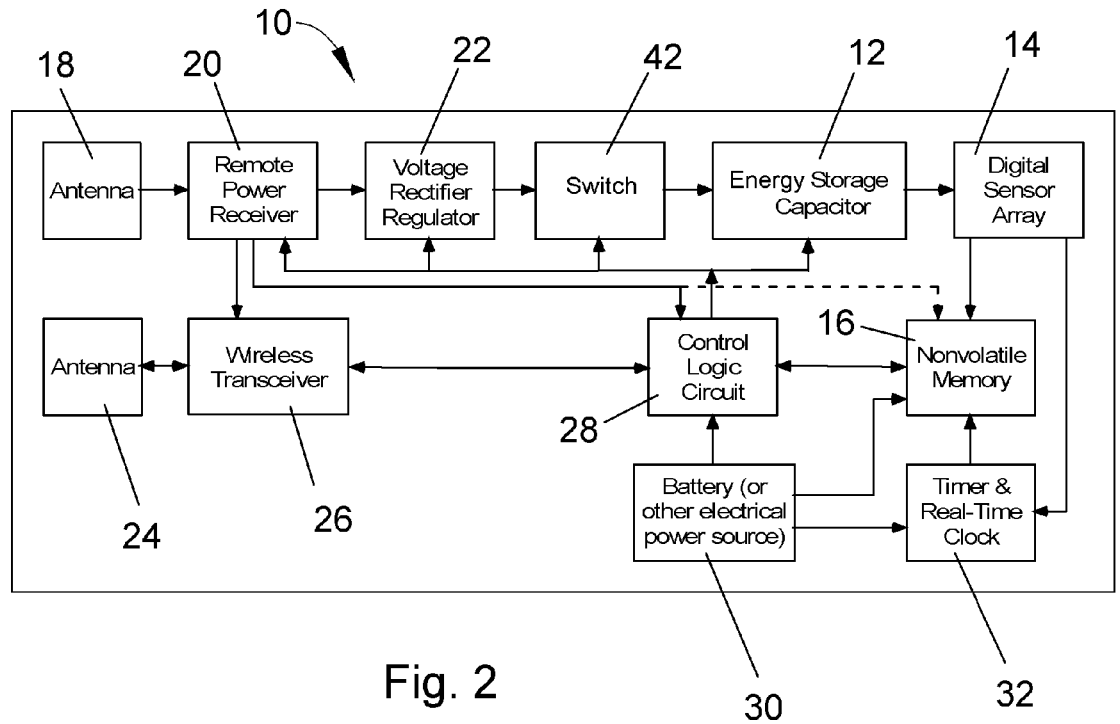
FIG. 2 is a simplified block diagram of a wireless MEMS sensor module similar to FIG. 1, but further having an internal battery for powering the nonvolatile memory, a timer circuitry, and a control logic circuit in accordance with another embodiment of the invention.
Figure 3:
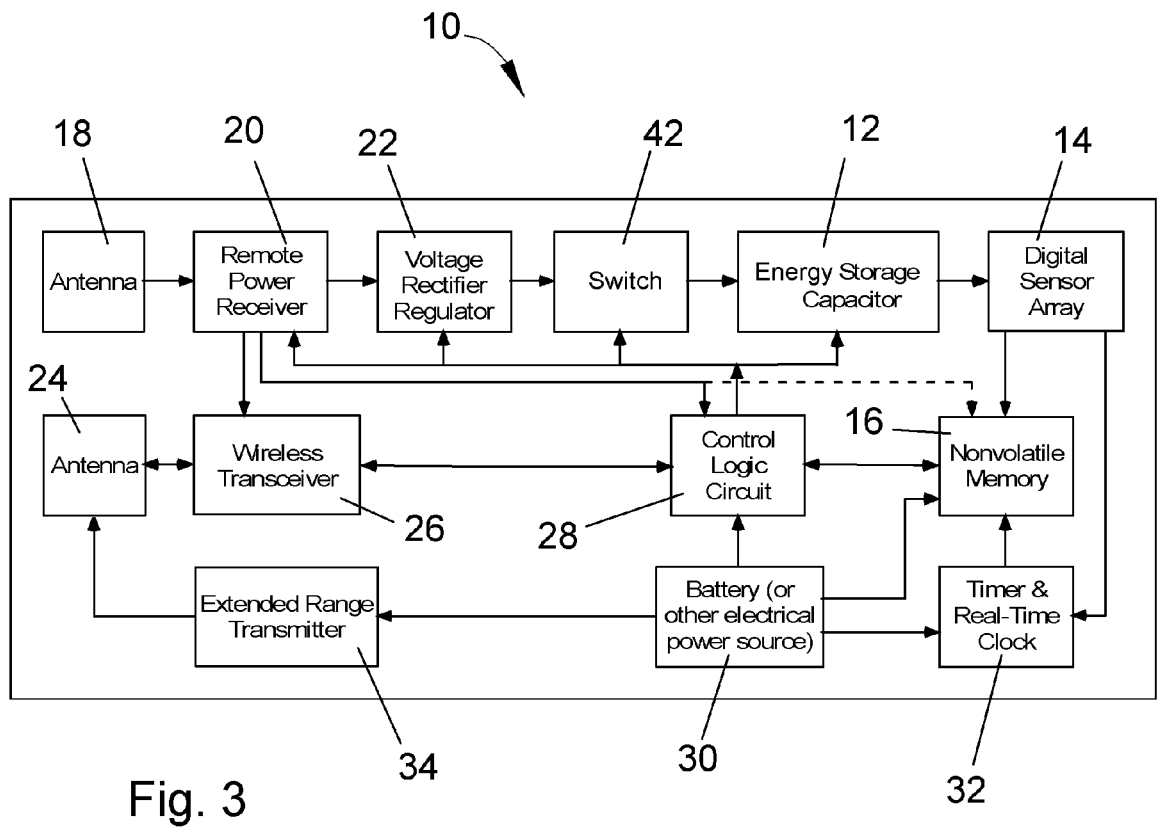
FIG. 3 is a simplified block diagram of a wireless MEMS sensor module similar to FIGS. 1 and 2, but further having an extended range transmitter powered by an internal battery in accordance with an embodiment of the invention.
Figure 4:
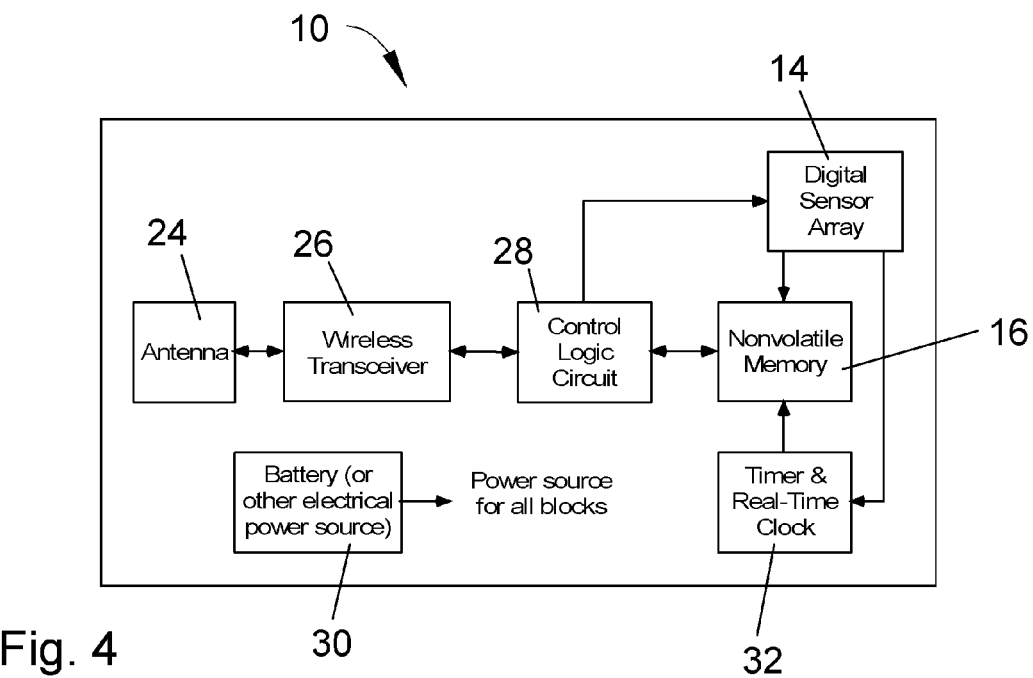
FIG. 4 is a simplified block diagram of a wireless MEMS sensor module having an internal battery for powering all but one or more digital sensor arrays and a nonvolatile memory in accordance with an embodiment of the invention.

FIGS. 1 through 4 represent block diagrams of wireless MEMS modules 10 within the scope of the invention. Each module 10 is shown as containing MEMS switches as described above in the form of a digital sensor array 14, such that the MEMS modules 10 may be termed MEMS sensor modules 10. The sensor arrays 14 are coupled to nonvolatile memory (NVM) 16, whose role is to store information relating to the on-off state of the switches within the sensor array 14, which in turn is preferably in response to an external input as discussed above. Each module 10 of FIGS. 1, 2, and 3 further includes an integrated energy (or power or charge) storage capacitor 12 electrically coupled to the sensor array 14. The capacitor 12 may be a single capacitor or made up of an array of multiple capacitors (for convenience, the following discussion will refer to the capacitor 12 in the singular, though it will be understood that capacitor arrays are also encompassed by this term). In FIG. 1, the module 10 does not contain an internal battery or other energy source except for the capacitor 12. Power is wirelessly provided to the capacitor 12 through an antenna 18, remote power receiver 20, and voltage rectifier regulator 22, all of which are well known in the art and therefore need no further discussion. A switch 42 between the regulator 22 and capacitor 12 isolates the capacitor 12 from its power source. A second antenna 24 (which may be combined with the antenna 18 into a single antenna) is coupled to a wireless transceiver 26 to enable control signals to be wirelessly received by the module 10 and output to be wirelessly transmitted from the module 10. A control logic circuit 28 is coupled to the capacitor 12, nonvolatile memory 16, power receiver 20, regulator 22, and transceiver 26 by which the operation of the module 10 and its components can be controlled. The module 10 of FIG. 2 is similar to that of FIG. 1, but includes an internal battery 30 for powering the control logic circuit 28 and a timer circuitry 32 with which the operation of the MEMS switches within the sensor array 14 can be timed, as well as to power up the nonvolatile memory 16 during write cycles triggered by the action of one or more of the MEMS switches. The module 10 of FIG. 3 is similar to FIG. 2, but further connects the battery 30 to an extended range transmitter 34 that enhances the broadcasting capability of the module 10. The module 10 of FIG. 4 differs from those of FIGS. 1, 2, and 3 by eliminating the capacitor 12 and its associated powering components, and instead utilizing the battery 30 to power the remaining components of the module 10 except the sensor array 14 and, optionally, the nonvolatile memory 16.

In view of the above, it can be appreciated that charging of the capacitor 12 (or other suitable energy storage device, including batteries) can be performed through remote wireless powering such as inductive or RF coupling, as well as through scavenging energy from the environment such as light, heat, vibrations, and other sources. It is also within the scope of this invention to allow for a wired connection to power the capacitor 12, though doing so can limit the applications for the MEMS modules 10. Finally, it should be appreciated that the MEMS modules 10 preferably include electronic circuitry for controlling the operation of the MEMS switches, power rectification and regulation as may be needed, and all of these circuitries can be powered by a remote power source, a battery, a wired connection, or any combination thereof.

Figure 5:
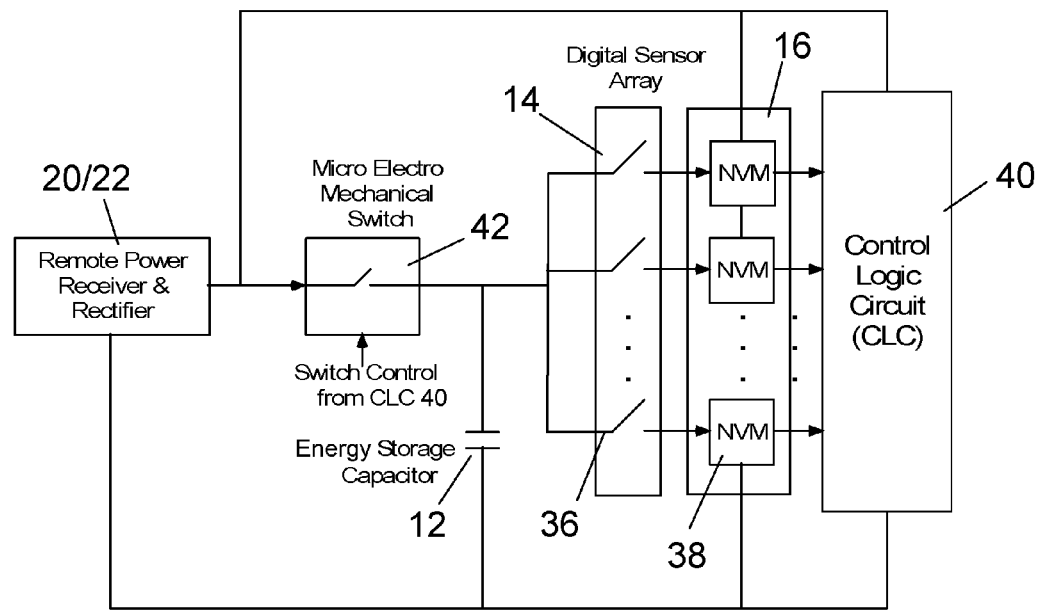
FIG. 5 is a simplified block diagram of circuitry containing an energy storage capacitor, digital sensor array, and nonvolatile memory, such as for use in the MEMS sensor modules represented in FIGS. 1 through 3, and showing a MEMS powering switch separating the energy storage capacitor from an energy source, the nonvolatile memory made up of individual nonvolatile memory (NVM) devices coupled to a control logic circuit, and the digital sensor array made up of individual MEMS switches that isolate and connect the charge storage capacitor and the NVM devices in accordance with a preferred aspect of the present invention.
Figure 11:
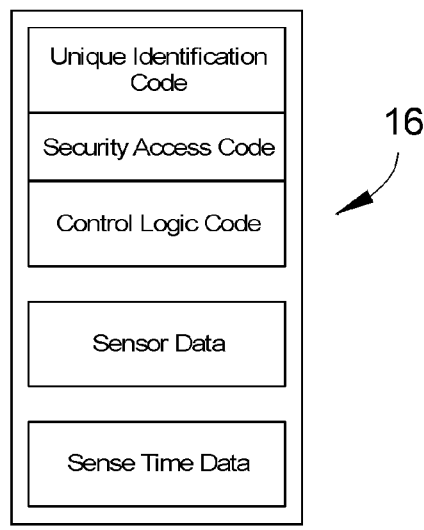
FIG. 11 schematically represents implementation schemes for the nonvolatile memory of a MEMS module according to an optional aspect of the invention.

FIG. 5 represents an isolation and connection scheme for the modules 10 of FIGS. 1, 2, and 3 as including the switch 42, integrated energy storage capacitor 12, sensor array 14, and nonvolatile memory 16. The sensor array 14 is represented as comprising a number of individual MEMS switches 36, and the nonvolatile memory 16 is represented as being made up of a corresponding number of individual nonvolatile memory devices 38. FIG. 11 represents the general implementation of the nonvolatile memory 16, which can be any combination of conventional electrical nonvolatile memory devices (for example, EEPROM or another nonvolatile erasable or non-erasable memory device), as well as digital and/or mechanical nonvolatile memory devices described below. The memory devices 38 are coupled to a control logic circuit (CLC) 40, with which the states of the memory devices 38 can be detected to produce an output.

To be suitable for use in the invention, the MEMS switches 36 must be miniature in scale and capable of integrated implementation at chip-scale, which enables the MEMS module 10 to use an array (or arrays) 14 of MEMS switches 36. Each MEMS switch 36 is configured to physically define an open electrical path that prevents the capacitor 12 from discharging therethrough. As will be discussed in more detail below, in certain embodiments (e.g., FIGS. 15 through 33) at least some of the MEMS switches 36 of the array 14 include a moving microstructure that, by closing an electrical contact, creates a closed electrical path that permits a controlled discharge of the capacitor 12. As noted above, this operation can be in response to an external input, such as an external environmental, chemical, or biological parameter, including but not limited to vibration, tilt, shock/acceleration, pressure, humidity, and temperature. Alternatively (e.g., FIG. 34), some or all of the MEMS switches 36 of the array 14 may include a high-impedance contact path whose conductivity increases in response to an external environmental, chemical, or biological parameter, such as through chemical or biological reactions and surface bindings. In either case, each MEMS switch 36 defines an open electrical path and effectively has a threshold above which it either closes a contact to create a closed electrical path or its contact resistance is sufficiently low to be considered a closed electrical path.

Figure 6:
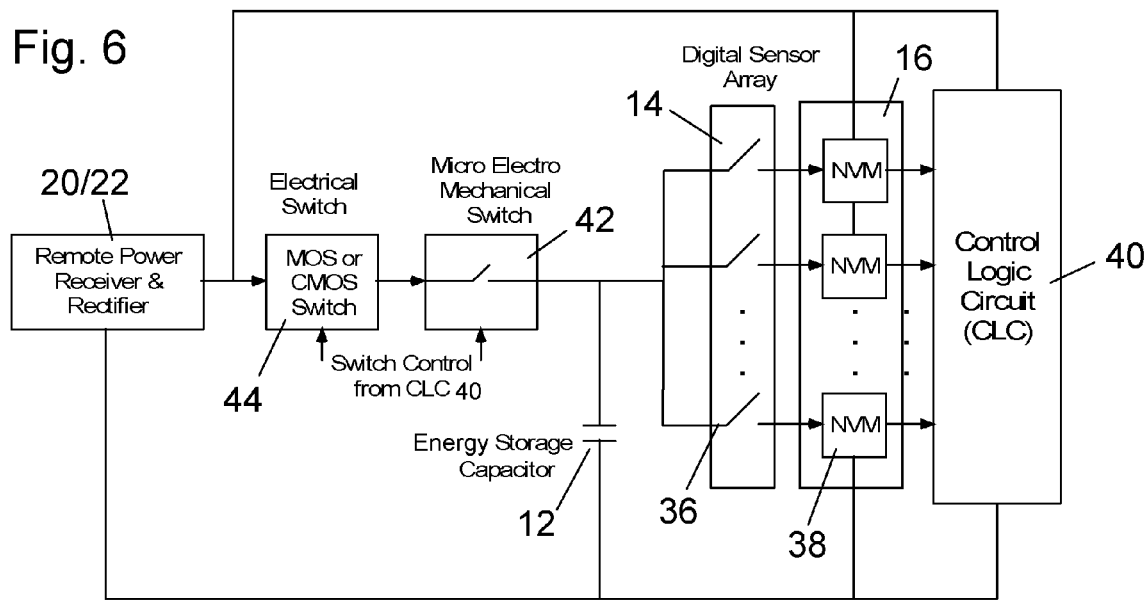
FIG. 6 is a simplified block diagram of circuitry similar to that of FIG. 5, but further including a series electronic switch that separates the MEMS powering switch from the energy source.

FIG. 5 represents the switch 42 as a MEMS powering switch 42 for isolating the capacitor 12 from its power source (e.g., the power receiver 20 and rectifier 22 of FIGS. 1, 2, and 3). The powering switch 42 effectively operates between an "ON" position to allow charging of the capacitor 12 and an "OFF" position when there is no charging such that charge leakage through the circuitry of the remote power receiver 20 and rectifier regulator 22 is prevented. In FIG. 6, the isolation and connection scheme is further equipped with a series electronic (e.g., metal oxide semiconductor (MOS)) switch 44 to the MEMS powering switch 42 to enable cold switching and maintain electrical isolation in the event that the MEMS powering switch 42 unintentionally closes due to external shock, vibrations, etc. The operation of both switches 42 and 44 can be controlled by the CLC 40. The MEMS powering switch 42 can have a locking mechanism, alternatively or in combination with the series electronic switch 44 to make sure it does not discharge the capacitor 44 when there is large external shock and vibrations. There are numerous ways of implementing the MEMS powering switch 42, such as a torsional switch with narrow electrodes that also function as restoring springs.

Figure 12:
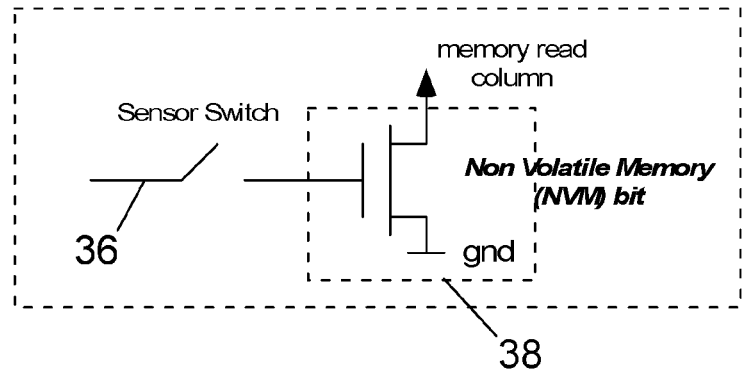
FIG. 12 is a simplified diagram of a MEMS sensing switch and a MOS-based digital nonvolatile memory device suitable for use in a MEMS module according to an optional aspect of the invention.
Figure 13:
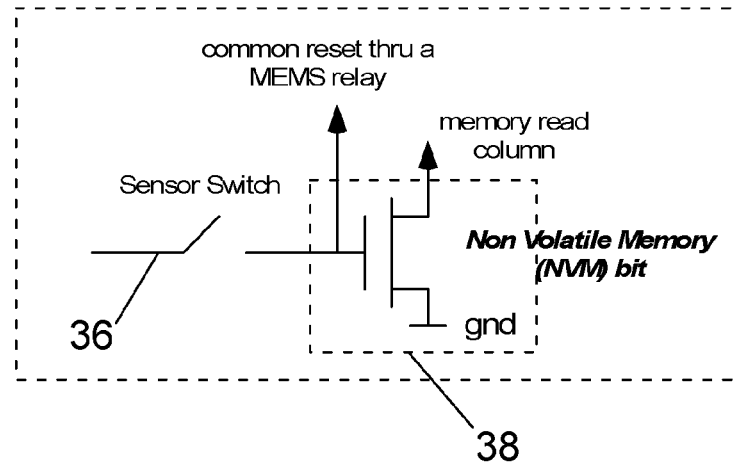
FIG. 13 is a simplified diagram of a MEMS sensing switch and a MOS-based digital nonvolatile memory device similar to that of FIG. 12, but further provided with a reset (or memory erase) capability.
Figure 14:
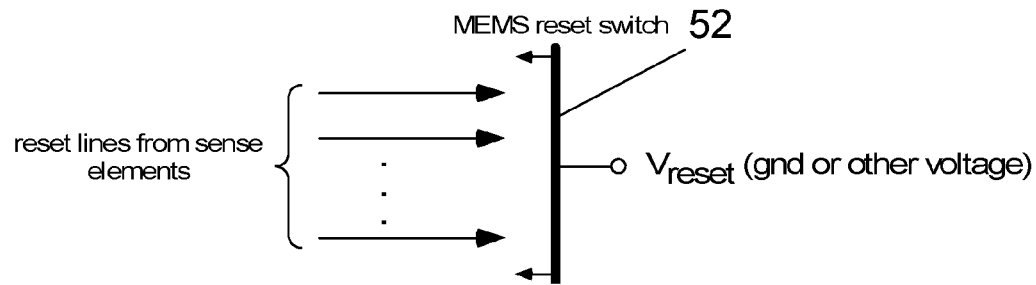
FIG. 14 is a simplified diagram representing the use of a MEMS-based switch for providing a reset (or memory erase) capability to a nonvolatile memory device according to an optional aspect of the invention.
Figure 19:
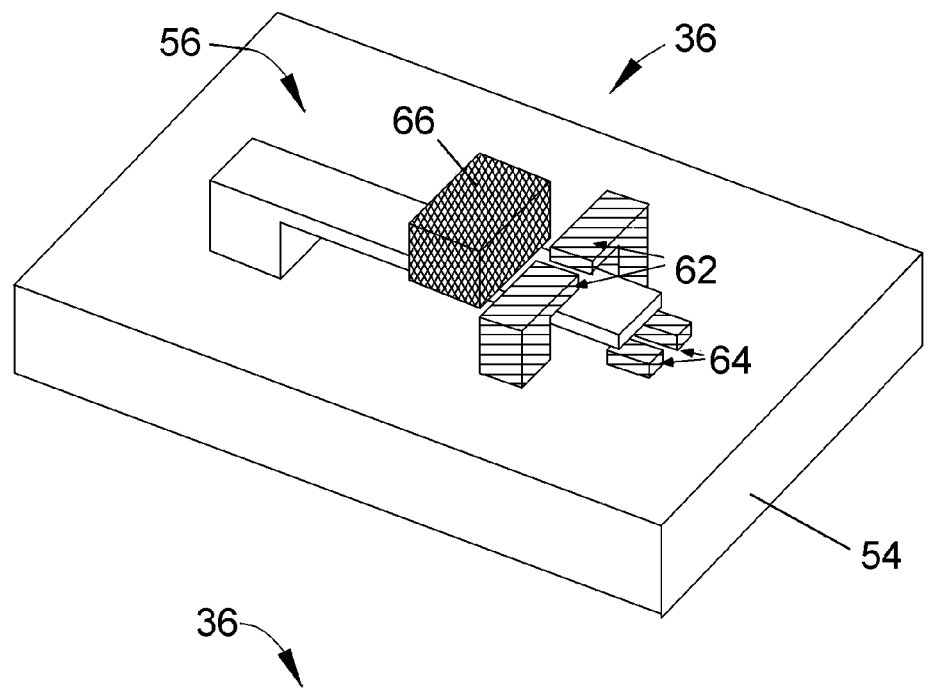
FIGS. 19 and 20 schematically represent perspective and side views, respectively, of a MEMS switch configured as a shock/acceleration sensor element for use in a digital sensor array of a MEMS sensor module according to an optional aspect of the invention.
Figure 20:
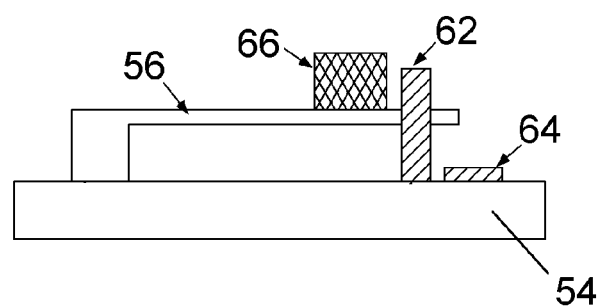
Figure 21:
FIGS. 21 and 22 schematically represent the MEMS switch of FIGS. 19 and 20 at opposite extremes of its operating range in response to two threshold shock and/or acceleration conditions.
Figure 22:
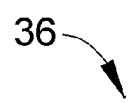
Figure 23:
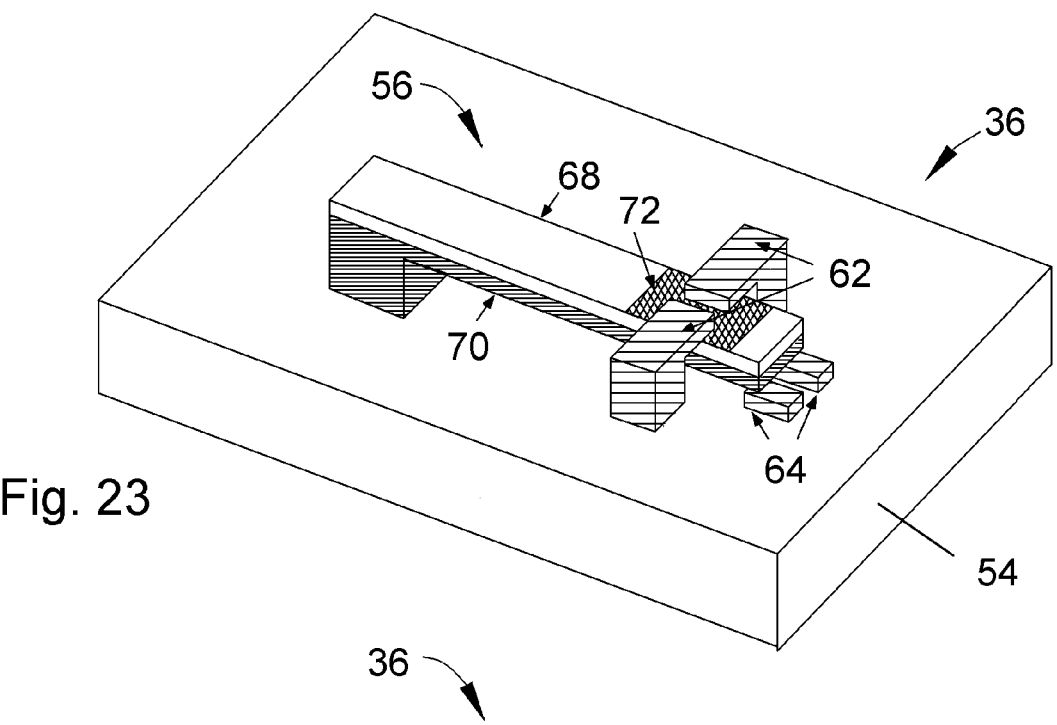
FIGS. 23 and 24 schematically represent perspective and side views, respectively, of a MEMS switch configured as a humidity sensor element for use in a digital sensor array of a MEMS sensor module according to an optional aspect of the invention.
Figure 24:
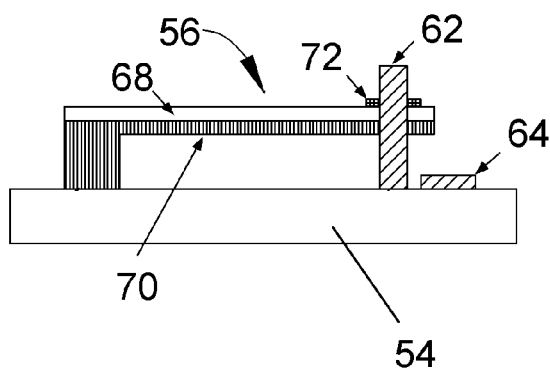

A closed electrical path formed by a MEMS switch 36 can result in different types of actions, depending on the intended function of the MEMS module 10. FIGS. 5 and 6 represent embodiments in which closed MEMS switches 36 transfer electrical charge from the capacitor 12 to the nonvolatile memory devices 38, which may be, for example, a floating gate of a MOS (or other integrated circuit) transistor as represented in FIGS. 12 and 13. The transistor retains the charge received from its switch 36 and acts as a single-bit nonvolatile digital memory device 38. Data stored in this memory device 38 can then be read with a remote or internal interrogation cycle, such as with the CLC 40. In this manner, if closure of the switch 36 is due to an event such as a sensed external input, the event is stored in the nonvolatile memory 38. As represented in FIG. 13, the MOS-based digital nonvolatile memory device of FIG. 12 can be further provided with a reset (or memory erase) capability, such as a common reset through a MEMS relay that discharges the memory gate capacitance. Finally, FIG. 14 depicts another option in which reset lines of individual digital nonvolatile memory devices 38 of the nonvolatile memory 16 are connected to a reset voltage through one or more MEMS isolation switches 52 that isolate the nodes from p-n junctions or other charge leakage paths, thereby minimizing charge leakage and extending the period that data can be retained in the nonvolatile memory 16.

Figure 7:
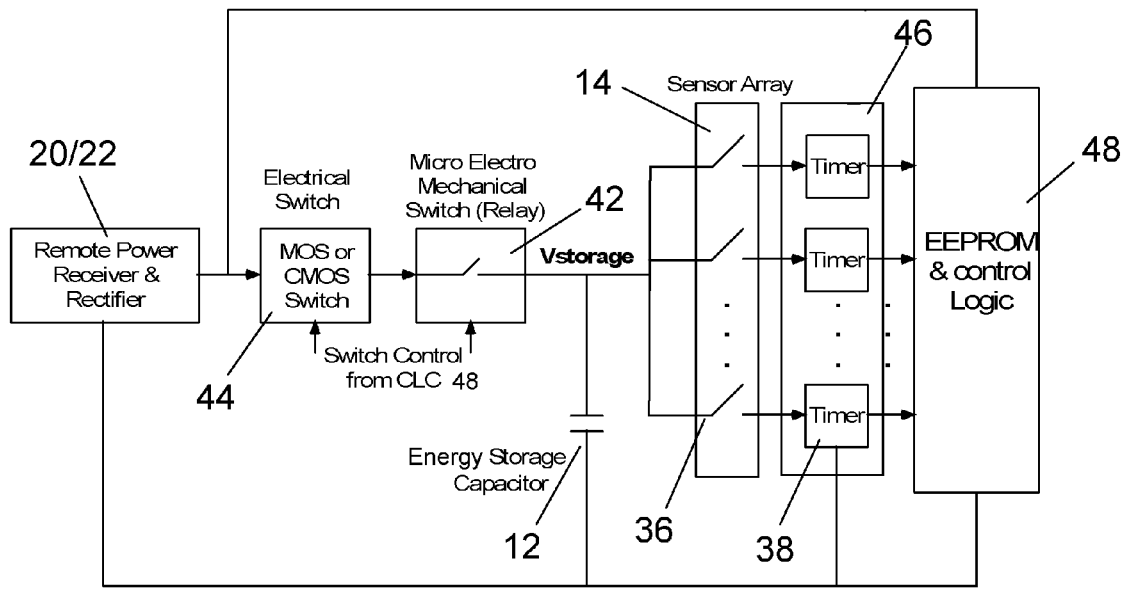
FIG. 7 is a simplified block diagram of circuitry similar to that of FIG. 6, but in which the NVM devices and control logic circuit are replaced with timer circuits and a memory and control logic circuitry.
Figure 8:
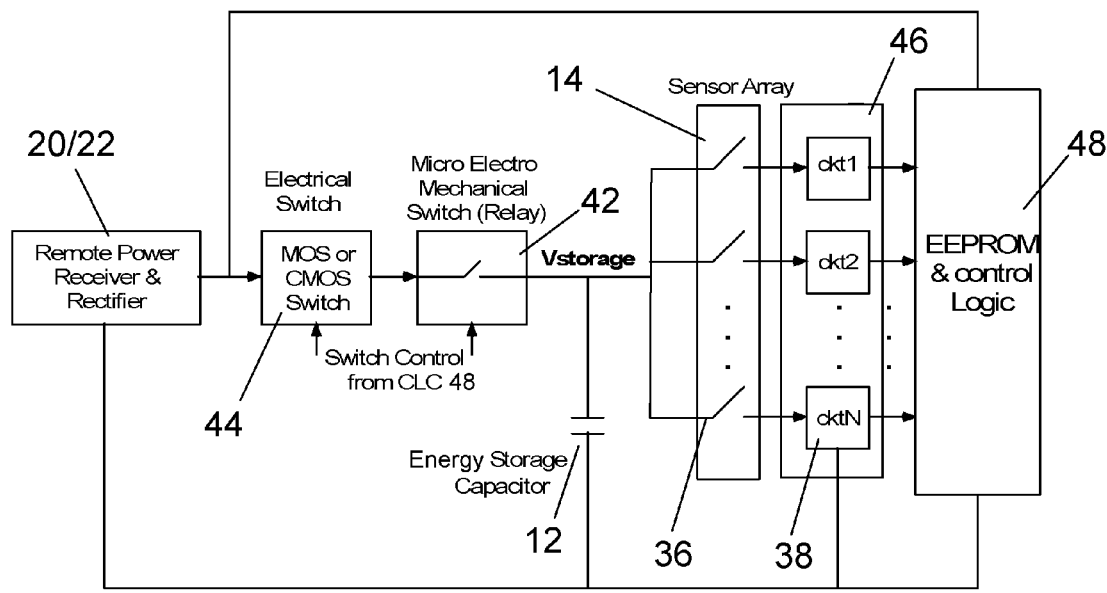
FIG. 8 is a simplified block diagram of circuitry similar to that of FIG. 6, but in which the NVM devices and control logic circuit are replaced with circuit blocks and a memory and control logic circuitry.
Figure 9:
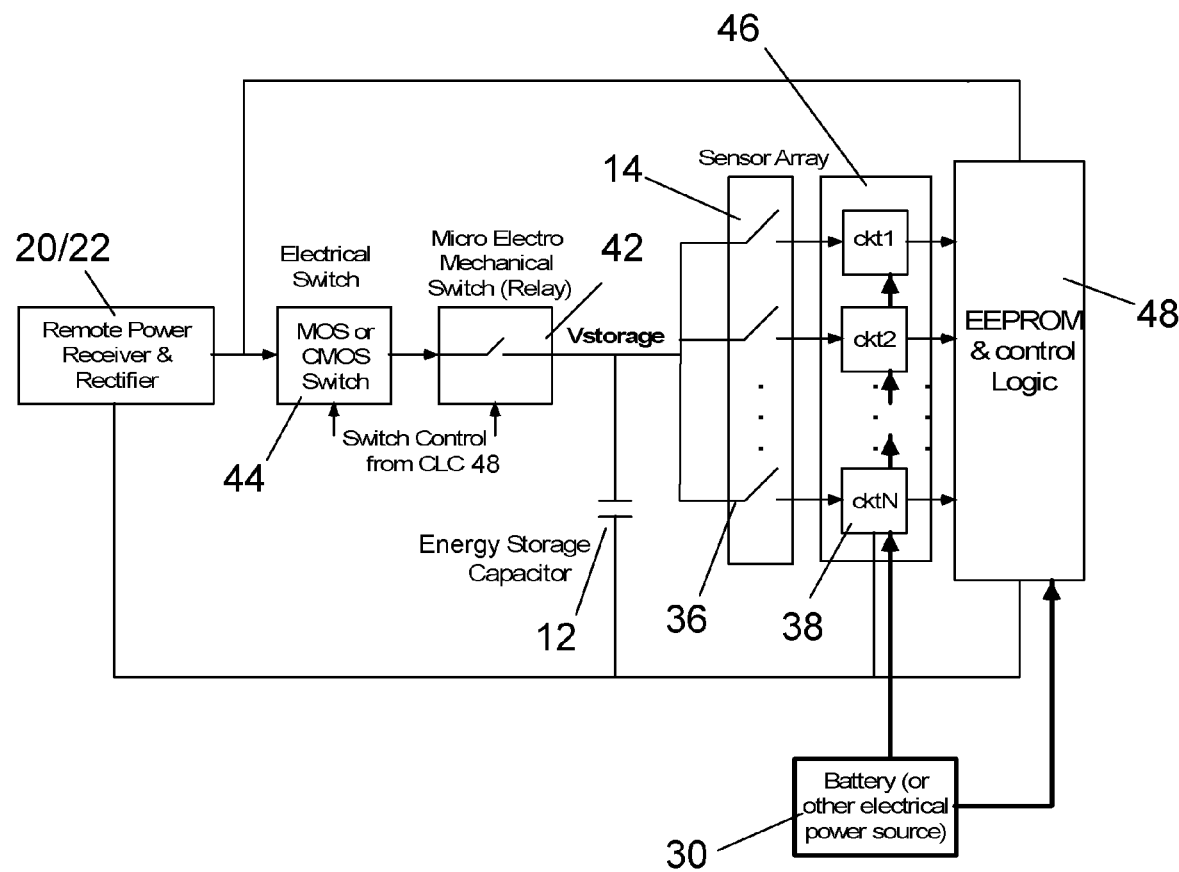
FIG. 9 is a simplified block diagram of circuitry similar to that of FIG. 8, further including a supplemental power source for powering the circuit blocks and the memory and control logic circuitry.
Figure 10:
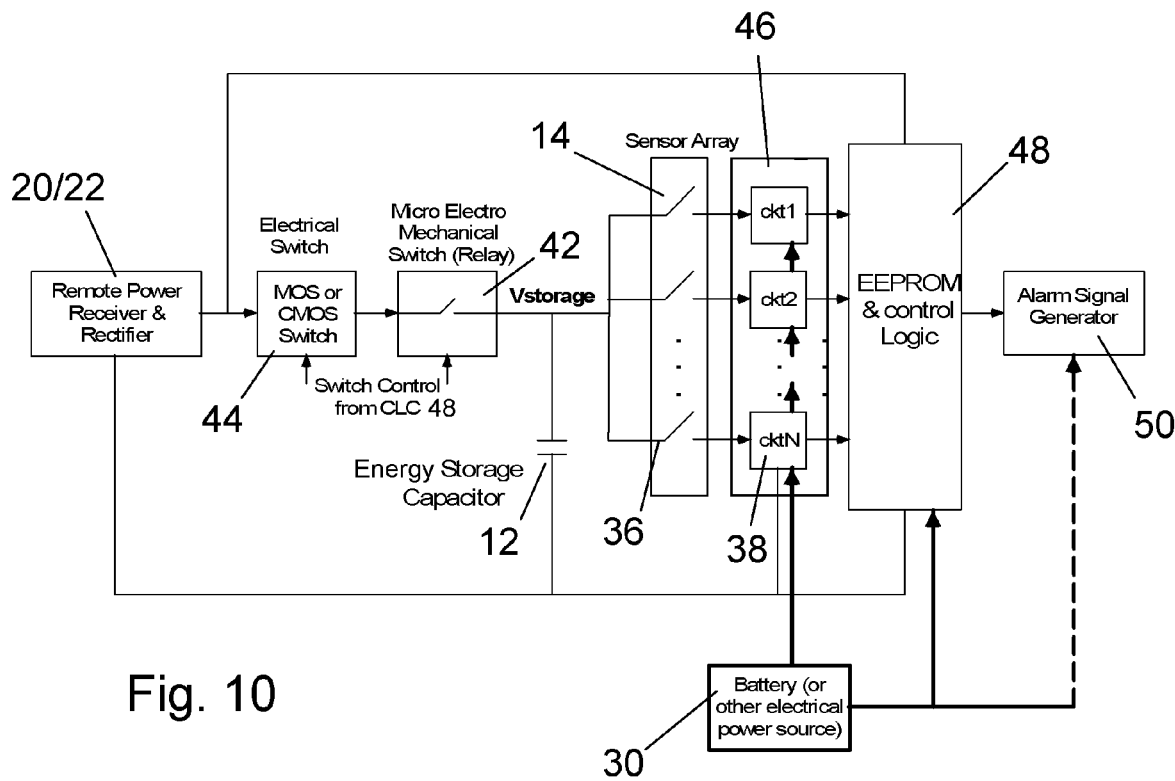
FIG. 10 is a simplified block diagram of circuitry similar to that of FIG. 9, further including an alarm connected to the memory and control logic circuitry.

Another option is for the closure of a MEMS switch 36 to deliver electrical power from the capacitor 12 and/or provide an input signal to electronic circuitry 46, as represented in FIGS. 7, 8, 9, and 10. In FIG. 7, the circuitry 46 is in the form of individual timers, such as for the purpose of providing a time-stamping capability and measuring exposure durations when the input sense parameter reaches switching thresholds of the MEMS switches 36. The outputs of the timers can then be acted upon by an EEPROM (or another nonvolatile erasable or nonerasable memory device) and control logic circuit 48. In FIG. 8, the circuitry 46 is in the form of individual circuit blocks that can be both powered and signaled by the closing of their respective MEMS switches 36. FIG. 9 is similar to FIG. 8, but employs a battery 30 to power the circuitry 46, such that the MEMS switches 36 are primarily for delivering input signals to the individual circuit blocks, resulting in overall higher power efficiency for the module 10. FIG. 10 further expands on the configuration of FIG. 9 with the inclusion of an alarm signal generator 50 that can be powered by the battery 30. The alarm generated by the generator 50 may be in the form of an electronic radio frequency signal, an audio signal, a visual signal, or any combination of these. With the embodiments of FIGS. 7, 8, 9, 10, as events are detected, further measurements and time can be captured and an active response can be initiated with the EEPROM and control logic circuit 48 while enabling continuous monitoring of subsequent events.

FIGS. 15 through 34 provide various approaches by which events that occur in an environmental, chemical, or biological parameter can be sensed by the MEMS switches 36 of the sensor array 14. In the embodiments of FIGS. 15 through 33, MEMS switches 36 are represented as having various types of mechanical structures that move in response to an external environmental parameter such as vibrations, tilt, shock/acceleration, pressure, humidity, temperature, etc. This motion causes the mechanical structure, initially separated from one or more contacts to form an open electrical path, to contact one or more contacts to form a closed electrical path. Either the contacts or the mechanical structure may be connected to the capacitor 12.

The movable mechanical structures of FIGS. 15 through 26 and 29 through 31 are cantilevered beams 56 fabricated directly on an integrated circuit substrate (e.g., CMOS wafer) 54 in which electronic devices (not shown) of the module 10 can also be formed. An alternative is to fabricate the beams 56 on a separate substrate that is subsequently electrically coupled or bonded to the integrated circuit substrate 54. The beam 56 of the MEMS switch 36 shown in FIGS. 15 through 18 is configured as a temperature sensor element fabricated to include two thin films 58 and 60 having different coefficients of thermal expansion (CTE). Metals such as aluminum and gold are believed to be suitable for the films 58 and 60, respectively, though it is foreseeable that other material combinations could be used, including other metals and nonmetals. While the films 58 and 60 are shown as being positioned one atop the other to yield a vertical bimorph stack (vertical being normal to the surface of the substrate 54), it should be understood that the films 58 and 60 could be arranged side-by-side to yield a horizontal (lateral) bimorph stack (again, relative to the surface of the substrate 54). Furthermore, as understood by those skilled in the art, the beam 56 could include additional layers/films, such as adhesion layers to promote adhesion of the films 58 and 60 to each other, and stress compensation layers to improve the distribution of any processing-induced strain within the beam 56. As examples, if the films 58 and 60 are aluminum and gold, suitable adhesion layer materials include titanium and chromium, which in some cases may also be suitable for use as a stress compensation layer. It is also within the scope of the invention to pattern some of the layers that form the beam 56 for the purpose of modifying their properties, including response to temperature and/or other environmental conditions, electrical conductivity for use as electrical contacts, etc. As such, it should be understood that the beam 56 comprises layers of various materials that, in combination, yield a bimorphic effect One end of the beam 56 is anchored to the substrate 54, while the opposite end of the beam 56 is suspended between two sets of open contact pairs 62 and 64. The beam 56 may have electrically-conductive layers (not shown) for making electrical contact with the contact pairs 62 and 64. It can be readily appreciated that the structure of the MEMS switch 36 is simple and compatible with post-CMOS processing, and that very large, high-density arrays of such switches 36 can be fabricated in a very small area.

As a result of its multilayer bimorphic construction, the cantilevered beam 56 freely deflects with temperature change due to the CTE mismatch of the films 58 and 60. FIGS. 17 and 18 illustrate an example of the MEMS switch 36 of FIGS. 15 and 16 in which the beam 56 has a vertical bimorph stack, with its upper film 58 having a higher CTE than the lower film 60, for example, an aluminum film 58 over a gold film 60. A contact-mode switching function is provided when the portion of the beam 56 between the contact pairs 62 and 64 touches one of the pairs 62 or 64, completing an electrical path containing that particular pair 62 or 64. The temperature sensitivity of the cantilevered beam 56 of any given MEMS switch 36 can be analytically obtained based on structure geometries and material properties. The tip deflection in a bimorph beam with no intrinsic stress is calculated by:

$$Y_{tip} = 3\Delta T(\alpha_2-\alpha_1)(t_2+t_1)L^2/(t_2^2(4+6t_1/t_2+4(t_1/t_2)^2+(E_1/E_2)(t_1/t_2)^3+E_2t_2/E_1t_1))$$

where $\Delta T$ is temperature change, $t_1$ and $t_2$ are the thicknesses of the films 58 and 60, $\alpha_1$ and $\alpha_2$ are the CTE's of the films 58 and 60, and E is the Young's modulus of elasticity of the films 58 and 60. Because sensitivity is independent of the beam width, the widths of the beams 56 of all MEMS switches 36 in a sensor array 14 can be minimized to reduce the size of the array 14 to the extent that manufacturing reliability allows. FIGS. 17 and 18 represent the MEMS switch 36 at opposite extremes of its operating range corresponding to two threshold temperature conditions. In FIG. 17, the beam 56 has contacted and closed the lower contacts 64, whereas in FIG. 18 the beam 56 has contacted and closed the upper contacts 62. The direction of the beam deflection is determined by the input temperature being higher or lower than a predetermined temperature condition (i.e., room temperature, manufacturing temperature, etc.), and the difference between the CTE's of the films 58 and 60. In this manner, each MEMS switch 36 can be configured to have a switching function at a desired temperature setpoint (threshold). Furthermore, the sensor array 14 can contain MEMS switches 36 whose beams 56 are intentionally of different lengths, with longer beams 56 being more sensitive to temperature and resulting in contact with one of the sets of contact pairs 62 and 64 at progressively smaller temperature changes with increasing beam lengths. Scaling of the feature sizes of the beams 56 improves the achievable measurement resolution in addition to the die size reduction.

FIGS. 19 through 22 represent a shock/acceleration-sensing MEMS switch 36 that also operates using a cantilevered beam 56. As evident from FIGS. 19 through 22, the shock/acceleration-sensing MEMS switch 36 is similarly constructed to the temperature MEMS switch 36 of FIGS. 15 through 18, with the notable exception that the beam 56 is not required to be bimorphic or constructed of multiple materials. Instead, a proof mass 66 is mounted on the beam 56 to increase the responsiveness of the beam 56 to the shock and/or acceleration levels of interest. As with the temperature-sensing MEMS switch 36 of FIGS. 15 through 18, the shock/acceleration-sensing MEMS switch 36 of FIGS. 19 through 22 has two operating extremes that result in the beam 56 contacting either the upper or lower pair of contacts 62 and 64 in response to a threshold level of shock/acceleration, depending on the direction of the input shock or acceleration. For one skilled in the art, it is clear that other configurations and structures for shock/vibration switches can be used as well, an example of which is discussed below in reference to FIG. 33.

Figure 25:
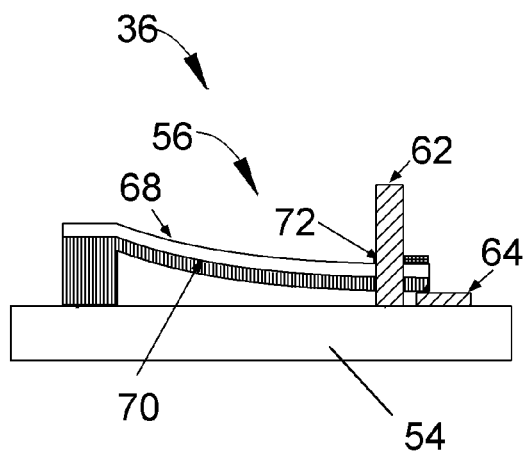
FIGS. 25 and 26 schematically represent the MEMS switch of FIGS. 23 and 24 at opposite extremes of its operating range in response to two threshold humidity conditions.
Figure 26:
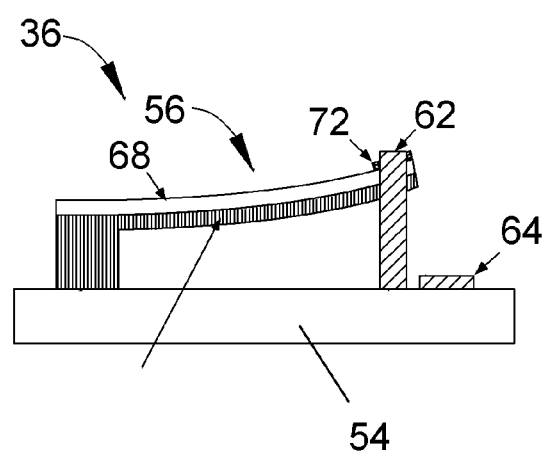

Also similar to the temperature MEMS switch 36 of FIGS. 15 through 18, FIGS. 23 through 26 represent a humidity-sensing MEMS switch 36 that operates on the basis of a bimorph effect using a cantilevered beam 56. In FIGS. 25 and 26, the beam 56 is shown at two operating extremes resulting in the beam 56 contacting either the upper or lower pair of contacts 62 and 64 in response to a threshold level of humidity, depending on whether the sensed humidity is higher or lower than the predetermined humidity condition (i.e., room humidity, manufacturing humidity, etc.). Deflection of the beam 56 and its threshold humidity levels are dependent on two thin films 68 and 70 formed of materials that exhibit different humidity-induced expansion characteristics. For processing purposes, the lower film 70 can be formed of a thin metal film that does not exhibit any appreciable humidity-induced expansion, such as aluminum or gold. In contrast, the upper film 68 of the beam 56 is preferably formed of a material that exhibits a notable response to humidity. Certain polymer materials are well suited for the upper film 68, a particular example of which is the PI-2730 series of low-stress G-line photodefinable polyamides available from HD Microsystems. For feature sizes below about three micrometers, a preferred material for the film 68 is believed to be a higher density low-stress I-line polyimide such as HD-8000, also available from HD Microsystems. Because of the poor electrical conductance of polymer materials that may be used to form the upper film 68, FIGS. 23 through 26 show the beam 56 is being provided with an electrically conductive layer 72 on that portion of the beam 56 that will contact the upper pair of contacts 62. As with the beam 56 of the temperature MEMS switch 36, the beam 56 of the humidity MEMS switch 36 can be formed to contain additional layers of a variety of different materials, both metallic and metallic, including adhesion-promoting, stress-distributing layers, and electrical contact layers, as well as patterned layers for the purpose of modifying the response of the beam 56 to humidity and other environmental conditions.

In general, the bimorphic humidity-sensitive beam 56 of FIGS. 23 through 26 operates on the basis of a sorption-induced volume expansion of a hygroscopic layer within the bimorph structure. The above-noted polyimides have coefficients of volume expansion on the order of $10^{-5}$/% RH, which is quite adequate for the sensing of humidity in accordance with this invention. It should be understood that identification of the most suitable polymer materials, film design, and optimum sensitivity are desirable, as is the ability to improve and adjust the humidity sorption of the upper film 68, such as by ion bombardment of the upper film 68 if formed of a preferred polyimide. Finally, it should also be understood that the response of the beam 56 to humidity can be altered by completing its fabrication in an environment containing a controlled level of humidity.

In practice, the thin films 58, 60, 68, and 70 of the beams 56 have intrinsic stresses, which cause the beams 56 to deflect at room temperature and humidity conditions, thus shifting the switching thresholds of the individual MEMS switches 36. Such an effect can be undesirable, particularly since controlling thin film stresses during manufacturing can be difficult. If necessary, this issue can be addressed in part by minimizing stresses in the initially deposited films 58, 60, 68, and 70 through the proper choice of materials. Aluminum and gold are good candidates for the films 58, 60, and 70 for this reason. If deposited by sputtering, the intrinsic stresses of metal layers (e.g., films 58, 60, and 70) can be further minimized by optimizing the deposition pressure and bias conditions. A post process temperature annealing step can also be performed to relieve intrinsic stresses to some extent, and helps to preclude sensor drift due to long term stress relaxation.

Figure 27:
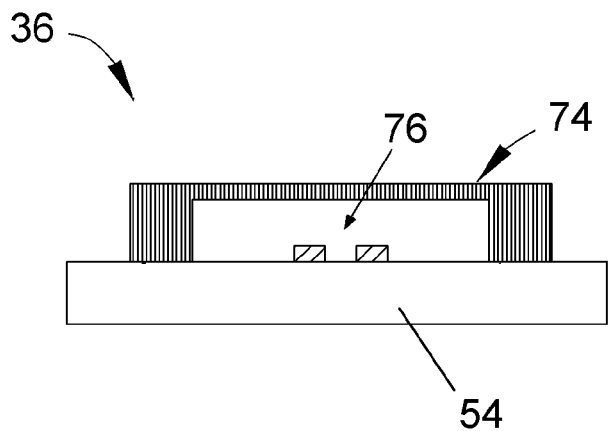
FIG. 27 schematically represents a side view of a MEMS switch configured as a pressure sensor element for use in a digital sensor array of a MEMS sensor module according to an optional aspect of the invention.
Figure 28:
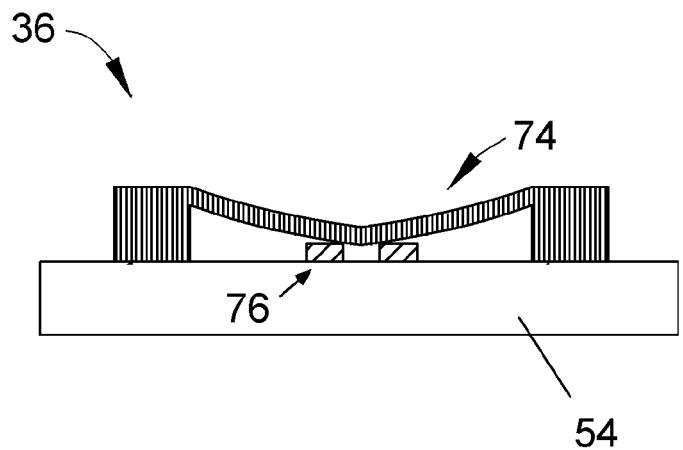
FIG. 28 schematically represents the MEMS switch of FIG. 27 at one extreme of its operating range in response to a threshold pressure condition.
Figure 29:
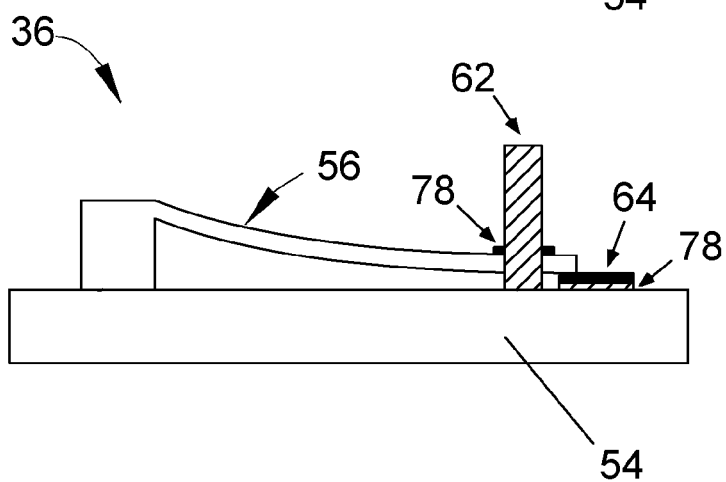
FIGS. 29 and 30 schematically represent side views of a MEMS switch configured to operate as both a sensor element and a mechanical nonvolatile memory device, so as to combine the functionalities of a digital sensor array and a nonvolatile memory of a MEMS sensor module according to an optional aspect of the invention.
Figure 30:
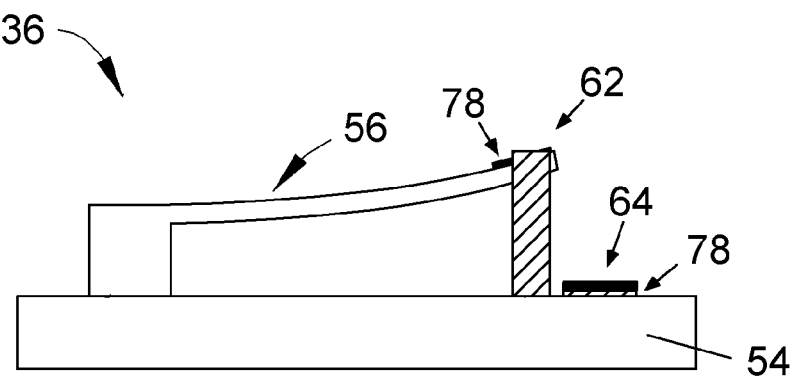

FIGS. 27 and 28 represent yet another embodiment for the MEMS switch 36, in which a diaphragm 74 is used in place of the cantilevered beams 56 discussed above. From FIGS. 27 and 28, it can be seen that the diaphragm 74 is supported above a pair of contacts 76, and that by forming the diaphragm 74, or at least its lower surface facing the contacts 76, of an electrically conductive material, a closed electrical path can be created across the contacts 76 if the ambient pressure above the diaphragm 74 meets or exceeds a threshold pressure. As well known in the art, the operation and sensitivity of the pressure-sensitive MEMS switch 36 of FIGS. 26 and 27 can be enhanced by evacuating the chamber formed by and between the diaphragm 74 and the substrate 54.

Because the beams 56 and diaphragm 74 or their respective contacts 62, 64, and 76 are connected to the capacitor 12, they are at different electrical voltages. As a result, once contact is made, the voltage difference can result in a sufficiently large electrostatic force that keeps the beam 56 or 74 in a closed position with its contacts. As represented with the beam 56 in FIGS. 29 and 30, by providing the beam 56 and/or its contacts 62 and 64 with thin dielectric layers 78, this voltage difference can be sufficiently high and sustained to keep the beam 56 pinned to the contacts 62 or 64 even after the sensed input parameter drops below the threshold for that parameter. Alternatively, the beam 56 can be provided with contact layers in place of the dielectric layers 78 whose contact resistance changes when the beam 56 is deflected. The deflected beam 56 can then be detected using capacitance, resistance, or inductance change detection circuitry, such as with the circuit blocks of FIGS. 8, 9, and 10. In this manner, the MEMS switches 36 can also behave as electro-mechanical nonvolatile memory devices, and therefore effectively take the place of the digital nonvolatile memory devices 38 utilized in FIGS. 5 and 6 and effectively merge the functionalities of the sensor arrays 14 and nonvolatile memories 16 of FIGS. 1, 2, 3, and 4. As with the MOS-based digital nonvolatile memory devices 38 represented in FIGS. 13 and 14, the MEMS switches 36 as electro-mechanical nonvolatile memory devices can be provided with a reset (or memory erase) capability by discharging the contact electrostatic capacitance that holds the mechanical structures to their contacts.

Figure 31:
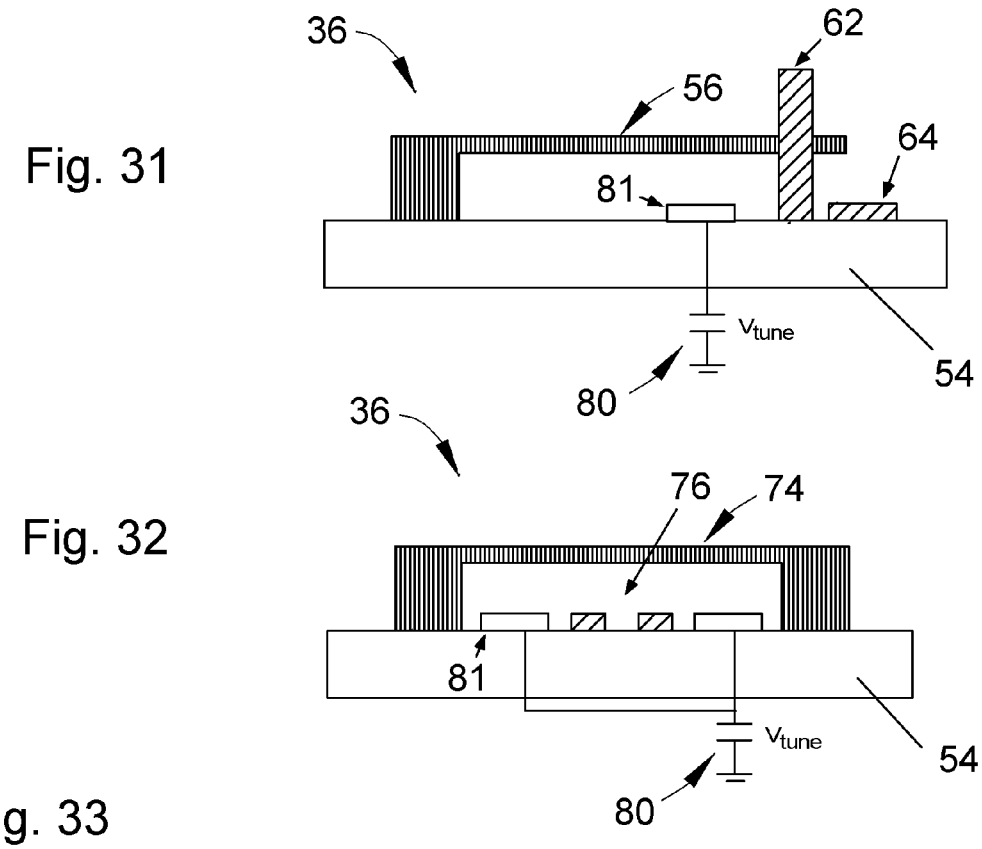

FIGS. 31 and 32 represent an approach for refining or calibrating the responses of the beams 56 and diaphragms 74 of the foregoing MEMS switches 36. In particular, FIGS. 31 and 32 depict a technique by which an adjustable electrical charge can be applied with an isolated capacitor 80 to one or more electrodes 81 placed in proximity to the beam 56 and diaphragm 74, enabling an adjustable electrostatic force to be applied that can bias (e.g., attract or repel) the beam 56 and diaphragm 74. In this manner, the deflection of the beam 56 and diaphragm 74 can be tuned so that contact with their corresponding contacts 62, 64, and 76 can be promoted or restrained. The capacitor 80 is preferably a low-leakage capacitor electrically isolated with a MEMS switch, such as in the manner discussed above for the capacitor 12.

Figure 33:
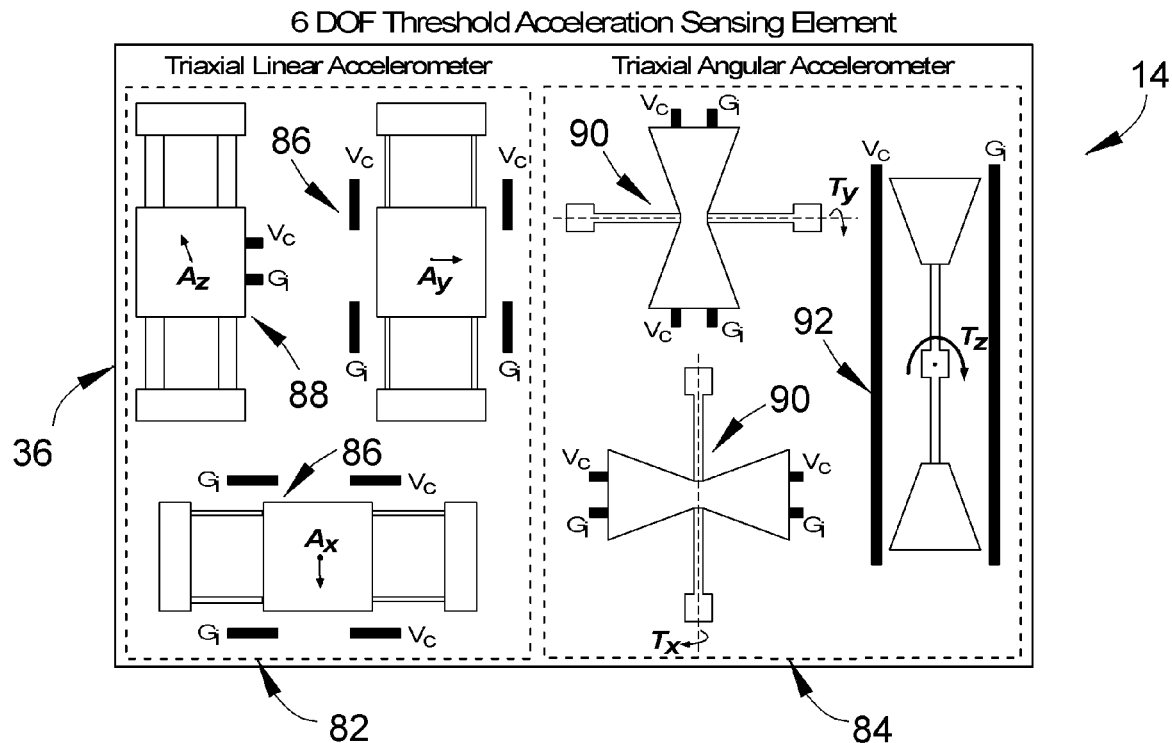
FIG. 33 schematically represents a plan view of MEMS switches for use in a digital sensor array of a MEMS sensor module of this invention, and configured for sensing linear and angular acceleration with six degrees of freedom according to an optional aspect of the invention.

FIG. 33 represents an acceleration sensor array 14 for use with the invention, in which multiple different MEMS switches 36 provide a six-degree of freedom (DOF) acceleration sensing capability, with each switch 36 being capable of functioning similarly to that described for the shock/vibration switch 36 of FIGS. 19 through 22. In particular, one set of the switches 36 constitute a triaxial linear accelerometer array 82 that includes two lateral switches 86 and one out-of-plane switch 88, and a second set of switches 36 constitute a triaxial angular accelerometer array 84 that includes two torsional switches 90 having in-plane axes and a torsional switch 92 having an out-of-plane axis implemented by two in-plane linear proof masses with cantilever supports placed on opposite sides of a single common anchor. Contacts are placed along opposite sides of the torsional switch 92 such that a connection can be only made if the proof masses move in opposite directions to each other. As such, a linear acceleration has no effect on the torsional switch 92 because it moves both proof masses in the same direction and opposite contacts cannot be made.

By appropriately selecting the suspension beam, proof mass, and gap between the contacts, desired switching thresholds can be obtained for the switches 36 represented in FIG. 33. Cross-axis sensitivity can be minimized by proper suspension design and proof mass design. For instance, the angular torsional switches 90 and 92 may have pie-shaped proof masses to maximize their response to external torque and minimize their linear response. The out-of-plane linear switch 88 requires a top contact (not shown) for bidirectional operation, which can be formed on a structure that also serves as an out-of-plane shock stop for all of the switches 86, 88, 90, and 92 in all axes.

In the embodiment of FIG. 34, the moving mechanical structures (beams 56, diaphragm 74, and switches 86, 88, 90, and 92) of the MEMS switches 36 of FIGS. 15 through 33 are replaced by a nonmoving MEMS switch 36, which can be adapted to sense chemical and/or biological inputs. As with the previous embodiments, the switch 36 can be fabricated on an integrated circuit substrate 54. Two contacts 94 are deposited so as to be connected by a non-electrically-conductive layer 96 formed of a chemical or biological sensitive material that, when exposed to a chemical or biological agent, increases in electrically conductivity. When the electrical conductivity of the layer 96 sufficiently increases to a certain threshold, an electrical "contact" is effectively completed between the two contacts 94 to establish a closed electrical path.

From the above, it can be appreciated that the MEMS switches 36 described in reference to FIGS. 15 through 34 can be extremely small to enable their integrated implementation at chip-scale. Furthermore, it should be understood that multiple MEMS switches 36 of any given type can be fabricated with different sensitivities to an environmental parameter to cover a wide range of threshold levels for the environmental parameter. It should also be evident that MEMS sensor modules 10 and their sensor arrays 14 can include essentially any combination of the MEMS switches 36 described above to monitor various different environmental parameters.

In the fabrication of any of the modules 10 and MEMS switches 36 discussed above, two general fabrication approaches can be used. The first is to directly form the switches 36 on the integrated circuit substrate 54, as represented in FIGS. 15 through 34. For instance, in a CMOS wafer, post-CMOS MEMS processing to produce the switches 36 may include deposition and etching steps, low temperature processing, and backend processing. Alternatively, the switches 36 can be fabricated on a different wafer followed by a batch device transfer, or by wafer level bonding and integration. Another alternative is to fabricate the MEMS switches 36 in what later becomes a cap wafer for the module 10.

As previously noted, the capacitor 12 in FIGS. 1 through 3 can be made up of a plurality of individual charge storage capacitors, forming an array in which individual capacitors may support subsets of MEMS switches 36, which may be determined by the parameters the switches 36 are adapted to sense. The capacitor 12 can also be implemented to provide individual storage capacitors for each MEMS switch 36. The charge storage capacitors can have different forms, including being directly implemented in CMOS using planar IC process layers, implemented with air gaps to ensure low leakage (in which case the capacitor can be formed similar to the MEMS switches 36), hybrid individually packaged and integrated with the module 10, hybrid and integrated at wafer level, integrated in the wafer package including its package cap, etc. To illustrate, FIG. 35 represents a process for fabricating the capacitor 12 to comprise a plurality of individual high-density integrated charge storage capacitors. A suitable process for producing a plurality of individual capacitors entails filling high-aspect-ratio trenches 102 etched in a silicon (or other semiconductor material) wafer 104 to have depths of several hundred micrometers. Filling is by depositing multiple conductive (e.g., LPCVD polysilicon) layers 98 separated by dielectric (e.g., nitride) layers 100. This approach can yield capacitor arrays capable of charge densities of several hundred nano farads per square millimeter. The capacitor 12 can be vertically integrated at wafer-level, which results in no or minimal die area increase and very low additional cost per die.

Figure 37:
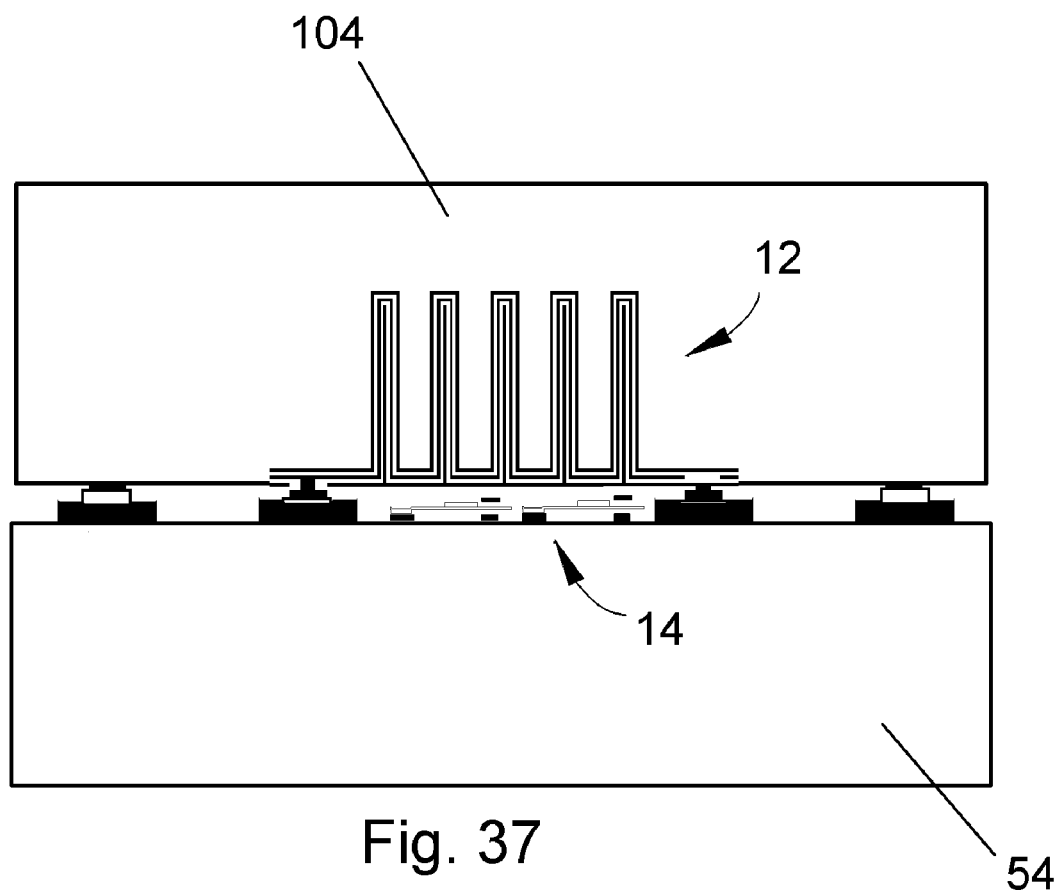
Figure 38:
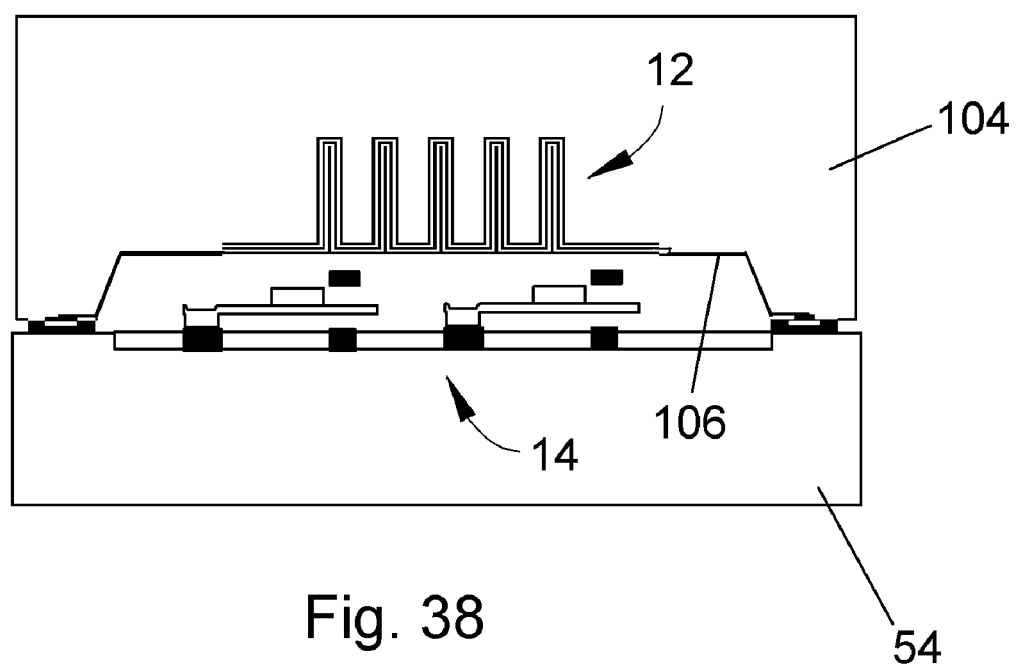

In FIG. 36, the wafer 104 in which the capacitor 12 of FIG. 35 is integrated is configured as a capping wafer 104 bonded to the substrate 54 in which the MEMS switches 36 were fabricated. FIGS. 37 and 38 are examples in which the high-density charge storage capacitor 12 is integrated in the capping wafer 104 so as to be located above the sensor array 14. In FIG. 38, the capacitor 12 is fabricated in a recessed region of the capping wafer 104 to increase the clearance between the capping wafer 104 and the sensor array 14 on the substrate 54, with polysilicon interconnects 106 formed on the surface of the recessed region for connecting the capacitor 12 to the sensor array 14 and other components of the module 10 fabricated on the substrate 54.

From the foregoing, it will be appreciated that modules 10 with the low power dissipation capabilities described above can be adapted for use in a wide variety of applications that can be implemented with wired and wireless sensor modules, or used in conjunction with passive and active RFID tags for RFID-based sensors. Therefore, while the invention has been described in terms of particular embodiments, it is apparent that other forms could be adopted by one skilled in the art. For example, the physical configurations and uses of the modules 10, MEMS switches 36, etc., could differ from that shown and described, and materials and processes other than those noted could be use. Therefore, the scope of the invention is to be limited only by the following claims.

The invention claimed is:

1. A micro-electro-mechanical system module comprising:
at least one integrated energy storage device having a charge thereon;
at least one electronic circuit powered by the charge on the energy storage device; and
means electrically coupled to the energy storage device for controlling charge transfers from the energy storage device to the electronic circuit while preventing charge leakage from the energy storage device to the electronic circuit to enable the energy storage device to store energy over an extended period of time, the controlling means comprising a plurality of integrated MEMS switches between and electrically coupling the energy storage device to the electronic circuit so as to define electrical paths that are individually opened and closed by a corresponding individual MEMS switch of the MEMS switches, each individual MEMS switch being adapted to individually define an open electrical path that prevents charge leakage therethrough from the energy storage device to the electronic circuit, each individual MEMS switch being operable to individually define a closed electrical path that allows a charge transfer therethrough from the energy storage device to the electronic circuit.

2. The micro-electro-mechanical system module according to claim 1, wherein the MEMS switches comprise movable microstructures capable of physical movement between open positions that define the open electrical paths and closed positions that define the closed electrical paths.

3. The micro-electro-mechanical system module according to claim 2, wherein the movable microstructures comprise cantilevered beams.

4. The micro-electro-mechanical system module according to claim 2, wherein the movable microstructures comprise diaphragms.

5. The micro-electro-mechanical system module according to claim 1, wherein the MEMS switches comprise high-impedance contact paths that define the open electrical paths and whose conductivities are capable of being increased to define the closed electrical paths.

6. The micro-electro-mechanical system module according to claim 1, wherein at least some of the MEMS switches are adapted to define the closed electrical paths in response to at least one external input.

7. The micro-electro-mechanical system module according to claim 6, wherein the MEMS switches have different levels of sensitivity to the external input.

8. The micro-electro-mechanical system module according to claim 6, wherein the at least one external input is at least one condition chosen from the group consisting of temperature, relative humidity, chemicals, motion, shock, vibration, orientation, pressure, acceleration, and biological agents to which the MEMS switches are subjected.

9. The micro-electro-mechanical system module according to claim 6, wherein the MEMS switches comprise high-impedance contact paths that define the open electrical paths and whose conductivities increase in response to the external input to define the closed electrical paths.

10. The micro-electro-mechanical system module according to claim 6, wherein the MEMS switches comprise movable microstructures that respond to the external input by physical movement thereof between open positions that define the open electrical paths and closed positions that define the closed electrical paths.

11. The micro-electro-mechanical system module according to claim 10, wherein the movable microstructures are associated with contacts to define switches therebetween, a gap exists between each of the movable microstructures and its respective contact when in the open position thereof to substantially prevent charge leakage from the energy storage device, and each of the movable microstructures is responsive to changes in the external input so that when in the closed position thereof the moveable microstructure contacts its respective contact and thereby allows a charge transfer from the energy storage device.

12. The micro-electro-mechanical system module according to claim 11, wherein the movable microstructures comprise cantilevered beams.

13. The micro-electro-mechanical system module according to claim 11, wherein the movable microstructures comprise diaphragms.

14. The micro-electro-mechanical system module according to claim 11, further comprising means for electrically biasing the movable microstructures toward or away from their respective contacts.

15. The micro-electro-mechanical system module according to claim 1, wherein the electronic circuit comprises means for storing the charge transfer.

16. The micro-electro-mechanical system module according to claim 15, wherein the storing means comprises nonvolatile digital memory devices.

17. The micro-electro-mechanical system module according to claim 16, wherein the nonvolatile digital memory devices comprise MOS devices.

18. The micro-electro-mechanical system module according to claim 15, wherein the storing means comprises nonvolatile mechanical memory devices.

19. The micro-electro-mechanical system module according to claim 18, wherein at least one of the nonvolatile mechanical memory devices comprises:
a movable microstructure; and
at least one contact spaced apart from the movable microstructure and electrically biased relative to the movable microstructure, the movable microstructure and the contact being electrically biased relative to each other so as to define an open circuit path therebetween when spaced apart and a closed circuit path when the movable microstructure moves into contact with the contact.

20. The micro-electro-mechanical system module according to claim 19, wherein the movable microstructure or the contact is electrically coupled to at least one of the MEMS switches and the charge transfer delivered by the at least one MEMS switch from the energy storage device is sufficient to move the movable microstructure into contact with the contact and the electrical bias between the movable microstructure and the contact is sufficient to retain the movable microstructure in contact with the contact.

21. The micro-electro-mechanical system module according to claim 19, wherein the at least one of the nonvolatile mechanical memory devices is one of the MEMS switches of the controlling means, and the charge transfer from the energy storage device is sufficient to move the movable microstructure into contact with the contact and the electrical bias between the movable microstructure and the contact is sufficient to retain the movable microstructure in contact with the contact.

22. The micro-electro-mechanical system module according to claim 19, wherein the electronic circuit comprises means selected from the group consisting of means for resistively sensing, means for inductively sensing, and means for capacitively sensing the closed circuit path formed when the movable microstructure contacts the contact.

23. The micro-electro-mechanical system module according to claim 15, further comprising means coupled to the storing means for producing an output that correlates the charge transfer to the external input.

24. The micro-electro-mechanical system module according to claim 15, further comprising means for discharging the storing means.

25. The micro-electro-mechanical system module according to claim 24, wherein the discharging means comprises micro-electro-mechanical switches.

26. The micro-electro-mechanical system module according to claim 1, wherein the electronic circuit comprises electronic circuit devices.

27. The micro-electro-mechanical system module according to claim 26, further comprising means coupled to the electronic circuit devices for correlating outputs thereof to the external input.

28. The micro-electro-mechanical system module according to claim 26, wherein the electronic circuit devices are powered solely by the charge transfer from the energy storage device through the MEMS switches.

29. The micro-electro-mechanical system module according to claim 26, wherein the electronic circuit devices comprise at least one device chosen from the group consisting of timers, alarms, memory devices, and sensing devices.

30. The micro-electro-mechanical system module according to claim 1, wherein the energy storage device is selected from the group consisting of capacitors, batteries, and combinations thereof.

31. The micro-electro-mechanical system module according to claim 1, wherein the energy storage device comprises an integrated capacitor.

32. The micro-electro-mechanical system module according to claim 1, further comprising means for charging the energy storage device.

33. The micro-electro-mechanical system module according to claim 32, further comprising:
a mechanical switch between the charging means and the energy storage device, the mechanical switch having an open position that defines an open electrical path that prevents charge delivery to the energy storage device and a closed position that defines a closed electrical path that allows charge delivery to the energy storage device; and
means for controlling the mechanical switch to selectively allow charging of the energy storage device.

34. The micro-electro-mechanical system module according to claim 33, further comprising:
an integrated circuit switch coupled to the mechanical switch and operable to selectively allow and prevent current flow to the mechanical switch; and
means for controlling the integrated circuit switch to selectively allow current flow to the mechanical switch.

35. The micro-electro-mechanical system module according to claim 32, wherein the module does not comprise a battery.

36. The micro-electro-mechanical system module according to claim 32, wherein the charging means comprises means for wirelessly delivering power to the module.

37. The micro-electro-mechanical system module according to claim 1, wherein the electronic circuit contains a leaky electrical junction and the open electrical paths defined by the MEMS switches prevent charge leakage from the energy storage device through the leaky electrical junction.

38. The micro-electro-mechanical system module according to claim 37, wherein the leaky electrical junction comprises a p-n junction or gate of the electronic circuit.

39. A micro-electro-mechanical system module comprising:
at least one integrated energy storage device having a charge thereon;
multiple circuit devices that are powered by the charge on the energy storage device; and
means electrically coupled to the energy storage device for controlling charge transfers from the energy storage device to the circuit devices while preventing charge leakage from the energy storage device to the circuit devices to enable the energy storage device to store energy over an extended period of time, the controlling means comprising a plurality of integrated MEMS switches, each of the circuit devices being electrically coupled to the energy storage device by at least one individual MEMS switch of the MEMS switches so that the MEMS switches define electrical paths between the energy storage device and the circuit devices, each individual MEMS switch being adapted to individually open and close a corresponding one of the electrical paths and thereby define an open electrical path that prevents charge leakage therethrough from the energy storage device to one of the circuit devices and define a closed electrical path that allows a charge transfer therethrough from the energy storage device to one of the circuit devices.

40. The micro-electro-mechanical system module according to claim 39, wherein at least one of the circuit devices contains a leaky electrical junction and the open electrical path defined by at least one of the MEMS switches prevents charge leakage from the energy storage device through the leaky electrical junction.

41. The micro-electro-mechanical system module according to claim 40, wherein the leaky electrical junction comprises a p-n junction or gate of the at least one circuit device.

42. A micro-electro-mechanical system module comprising:
   at least one integrated energy storage device;
   a power source for supplying power to the energy storage device, the power source containing circuitry through which charge leakage can occur; and
   means electrically coupling the power source to the energy storage device for controlling charging of the energy storage device, the controlling means comprising a MEMS switch that defines an open electrical path that prevents charge leakage from the energy storage device through the circuitry of the power source and being operable to define a closed electrical path that allows charging of the energy storage device by the power source.

43. The micro-electro-mechanical system module according to claim 42, further comprising:
   an integrated circuit switch coupled to the MEMS switch and operable to selectively allow and prevent current flow to the MEMS switch; and
   means for controlling the integrated circuit switch to selectively allow current flow to the MEMS switch.

* * * * *